(12) United States Patent
Cheng et al.

(10) Patent No.: US 9,748,862 B2
(45) Date of Patent: Aug. 29, 2017

(54) SPARSE MATRIX MULTILEVEL ACTIVELY CLAMPED POWER CONVERTER

(71) Applicant: Rockwell Automation Technologies, Inc., Mayfield Heights, OH (US)

(72) Inventors: Zhongyuan Cheng, Cambridge (CA); Navid Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 44 days.

(21) Appl. No.: 14/710,690

(22) Filed: May 13, 2015

(65) Prior Publication Data

US 2016/0336872 A1    Nov. 17, 2016

(51) Int. Cl.
*H02M 3/158*  (2006.01)
*H02M 7/487*  (2007.01)
*H02M 7/538*  (2007.01)
*H02M 1/00*  (2006.01)

(52) U.S. Cl.
CPC ......... *H02M 7/487* (2013.01); *H02M 3/1584* (2013.01); *H02M 7/538* (2013.01); *H02M 2001/007* (2013.01)

(58) Field of Classification Search
None
See application file for complete search history.

(56) References Cited

U.S. PATENT DOCUMENTS

| | | | |
|---|---|---|---|
| 4,443,841 A | 4/1984 | Mikami et al. | |
| 4,783,728 A | 11/1988 | Hoffman | |
| 4,894,621 A | 1/1990 | Koenig et al. | |
| 5,298,848 A | 3/1994 | Ueda et al. | |
| 5,361,196 A | 11/1994 | Tanamachi et al. | |
| 5,502,633 A | 3/1996 | Miyazaki et al. | |
| 5,625,545 A | 4/1997 | Hammond | |
| 5,638,263 A | 6/1997 | Opal et al. | |
| 5,642,275 A | 6/1997 | Peng et al. | |
| 5,790,396 A | 8/1998 | Miyazaki et al. | |
| 5,933,339 A | 8/1999 | Duba et al. | |
| 5,986,909 A | 11/1999 | Hammond et al. | |
| 6,005,788 A | 12/1999 | Lipo et al. | |
| 6,031,738 A | 2/2000 | Lipo et al. | |
| 6,058,031 A | 5/2000 | Lyons et al. | |

(Continued)

FOREIGN PATENT DOCUMENTS

| | | |
|---|---|---|
| CN | 1190278 | 8/1998 |
| CN | 1253999 | 5/2000 |
| CN | 1414692 | 4/2003 |
| CN | 2577503 | 10/2003 |
| CN | 190885 C | 2/2005 |

(Continued)

OTHER PUBLICATIONS

Fang Zhang Peng, A generalized multilevel inverter topology siwth self voltage balancing, Mar./Apr. 2001, IEEE, pp. 611-618.*

(Continued)

*Primary Examiner* — Jeffrey Gblende
(74) *Attorney, Agent, or Firm* — Fay Sharpe LLP

(57) ABSTRACT

Power converters are presented with one or more sparse multilevel actively clamped (SMAC) power converter stages, where the individual stages include an integer number N capacitors or DC voltage sources coupled between stage DC inputs to provide L=N+1 converter stage DC voltage nodes, with a switching circuit having no more than L*(L−1) switching devices and no flying or floating DC storage capacitors, where N is greater than 2.

13 Claims, 24 Drawing Sheets

(56) References Cited

U.S. PATENT DOCUMENTS

| | | |
|---|---|---|
| 6,075,350 A | 6/2000 | Peng |
| 6,075,717 A | 6/2000 | Kumar et al. |
| 6,101,109 A | 8/2000 | Duba et al. |
| 6,166,929 A | 12/2000 | Ma et al. |
| 6,222,284 B1 | 4/2001 | Hammond et al. |
| 6,229,722 B1 | 5/2001 | Ichikawa et al. |
| 6,236,580 B1 | 5/2001 | Aiello et al. |
| 6,269,010 B1 | 7/2001 | Ma et al. |
| 6,295,215 B1 | 9/2001 | Faria et al. |
| 6,320,767 B1 | 11/2001 | Shimoura et al. |
| 6,359,416 B1 | 3/2002 | Rao et al. |
| 6,366,483 B1 | 4/2002 | Ma et al. |
| 6,411,530 B2 | 6/2002 | Hammond et al. |
| 6,469,916 B1 | 10/2002 | Kerkman et al. |
| 6,477,067 B1 | 11/2002 | Kerkman et al. |
| 6,541,933 B1 | 4/2003 | Leggate et al. |
| 6,556,461 B1 | 4/2003 | Khersonsky et al. |
| 6,617,821 B2 | 9/2003 | Kerkman et al. |
| 6,636,012 B2 | 10/2003 | Royak et al. |
| RE38,439 E | 2/2004 | Czerwinski |
| 6,697,271 B2 | 2/2004 | Corzine |
| 6,697,274 B2 | 2/2004 | Bernet et al. |
| 6,703,809 B2 | 3/2004 | Royak et al. |
| 6,720,748 B1 | 4/2004 | Seibel et al. |
| 6,795,323 B2 | 9/2004 | Tanaka et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,859,374 B2 | 2/2005 | Pollanen et al. |
| 6,982,533 B2 | 1/2006 | Seibel et al. |
| 7,034,501 B1 | 4/2006 | Thunes et al. |
| 7,057,905 B2 | 6/2006 | Macmillan |
| 7,068,526 B2 | 6/2006 | Yamanaka |
| 7,106,025 B1 | 9/2006 | Yin et al. |
| 7,164,254 B2 | 1/2007 | Kerkman et al. |
| 7,170,767 B2 | 1/2007 | Bixel |
| 7,180,270 B2 | 2/2007 | Rufer |
| 7,215,559 B2 | 5/2007 | Nondahl et al. |
| 7,274,576 B1 | 9/2007 | Zargari et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,428,158 B2 | 9/2008 | Bousfield, III et al. |
| 7,471,525 B2 | 12/2008 | Suzuki et al. |
| 7,495,410 B2 | 2/2009 | Zargari et al. |
| 7,495,938 B2 | 2/2009 | Wu et al. |
| 7,511,976 B2 | 3/2009 | Zargari et al. |
| 7,568,931 B2 | 8/2009 | Hammond |
| 7,589,984 B2 | 9/2009 | Salomaki |
| 7,649,281 B2 | 1/2010 | Lai et al. |
| 7,800,254 B2 | 9/2010 | Hammond |
| 7,830,681 B2 | 11/2010 | Abolhassani et al. |
| 7,894,224 B2 | 2/2011 | Ulrich |
| 7,978,488 B2 | 7/2011 | Tanaka et al. |
| 8,008,923 B2 | 8/2011 | Hammond |
| 8,040,101 B2 | 10/2011 | Itoh et al. |
| 8,093,764 B2 | 1/2012 | Hammond |
| 8,107,267 B2 | 1/2012 | Tallam et al. |
| 8,130,501 B2 | 3/2012 | Ledezma et al. |
| 8,138,697 B2 | 3/2012 | Palma |
| 8,144,491 B2 | 3/2012 | Bendre et al. |
| 8,159,840 B2 | 4/2012 | Yun |
| 8,279,640 B2 | 10/2012 | Abolhassani et al. |
| 8,400,793 B2 | 3/2013 | Jonsson |
| 8,441,147 B2 | 5/2013 | Hammond |
| 8,508,066 B2 | 8/2013 | Lee et al. |
| 8,619,446 B2 | 12/2013 | Liu et al. |
| 8,817,499 B2 | 8/2014 | Videt |
| 8,860,380 B2 | 10/2014 | Hasler |
| 8,929,111 B2 | 1/2015 | White |
| 9,036,379 B2 | 5/2015 | Schroeder |
| 2001/0048290 A1 | 12/2001 | Underwood et al. |
| 2007/0211501 A1 | 9/2007 | Zargari et al. |
| 2007/0297202 A1 | 12/2007 | Zargari et al. |
| 2008/0079314 A1 | 4/2008 | Hammond |
| 2008/0174182 A1 | 7/2008 | Hammond |
| 2008/0180055 A1 | 7/2008 | Zargari et al. |
| 2009/0073622 A1 | 3/2009 | Hammond |
| 2009/0085510 A1 | 4/2009 | Pande et al. |
| 2009/0128083 A1 | 5/2009 | Zargari |
| 2009/0184681 A1 | 7/2009 | Kuno |
| 2010/0025995 A1 | 2/2010 | Lang et al. |
| 2010/0078998 A1 | 4/2010 | Wei et al. |
| 2010/0080028 A1 | 4/2010 | Cheng et al. |
| 2010/0091534 A1 | 4/2010 | Tadano |
| 2010/0109585 A1 | 5/2010 | Iwahori et al. |
| 2010/0141041 A1 | 6/2010 | Bose et al. |
| 2010/0301975 A1 | 12/2010 | Hammond |
| 2011/0019449 A1 | 1/2011 | Katoh et al. |
| 2011/0095603 A1 | 4/2011 | Lee et al. |
| 2011/0249479 A1 | 10/2011 | Capitaneanu et al. |
| 2012/0057380 A1 | 3/2012 | Abe |
| 2012/0057384 A1 | 3/2012 | Jones |
| 2012/0113698 A1 | 5/2012 | Inoue |
| 2012/0195078 A1 | 8/2012 | Levin et al. |
| 2012/0201056 A1 | 8/2012 | Wei |
| 2012/0212982 A1 | 8/2012 | Wei et al. |
| 2012/0218795 A1 | 8/2012 | Mihalache |
| 2012/0306716 A1* | 12/2012 | Satake ............... H03K 17/693 |
| | | 343/841 |
| 2013/0121041 A1 | 5/2013 | Schroeder et al. |
| 2013/0121042 A1 | 5/2013 | Gan et al. |
| 2013/0148390 A1 | 6/2013 | Na |
| 2013/0223651 A1 | 8/2013 | Hoyerby |
| 2013/0272045 A1 | 10/2013 | Soeiro |
| 2014/0003099 A1 | 1/2014 | Dillig et al. |
| 2014/0036557 A1 | 2/2014 | Liu et al. |
| 2014/0042817 A1 | 2/2014 | Zargari et al. |
| 2014/0063870 A1 | 3/2014 | Bousfield, III |
| 2014/0098587 A1 | 4/2014 | Yatsu |
| 2014/0146586 A1 | 5/2014 | Das et al. |
| 2014/0204632 A1 | 7/2014 | Noetzold et al. |
| 2014/0268928 A1 | 9/2014 | Wei et al. |
| 2014/0268967 A1 | 9/2014 | White et al. |
| 2014/0293667 A1 | 10/2014 | Schroeder et al. |
| 2014/0376287 A1 | 12/2014 | Wu et al. |
| 2015/0280608 A1 | 10/2015 | Yoscovich et al. |

FOREIGN PATENT DOCUMENTS

| | | | |
|---|---|---|---|
| CN | 1400731 A | 3/2005 | |
| CN | 2737060 | 10/2005 | |
| CN | 1925289 | 3/2007 | |
| CN | 101795057 A | 8/2010 | |
| CN | 102739030 A | 10/2012 | |
| CN | 102983568 A | 3/2013 | |
| CN | 103051167 A | 4/2013 | |
| CN | 103078539 A | 5/2013 | |
| EP | 0874448 | 10/1998 | |
| EP | 1641111 A2 | 3/2006 | |
| EP | 1713168 A3 | 10/2006 | |
| EP | 2378865 | 4/2012 | |
| EP | 2568591 A1 | 3/2013 | |
| EP | 2698912 A2 | 2/2014 | |
| EP | 2838189 A2 * | 2/2015 | ............ H02M 7/483 |
| GB | 1295261 A | 11/1972 | |
| GB | 2345594 A | 7/2000 | |
| JP | 2006223009 A | 8/2006 | |
| JP | 2013102674 A | 5/2013 | |
| KR | 20080061641 A | 7/2008 | |
| TW | 439350 | 6/2001 | |
| WO | WO2012105737 A1 | 8/2012 | |
| WO | WO2013091675 A1 | 6/2013 | |

OTHER PUBLICATIONS

Ghias et al., "Performance Evaluation of a Five-Level Flying Capacitor Converter With Redcued DC Bus Capacitance Under Two Different Modulation Schemes"; Power Electronics for Distributed Generation Systems (PEDG); 2012 3$^{rd}$ IEEE Int'l Symposium, IEEE, Jun. 25, 2012; pp. 857-864.

(56) References Cited

OTHER PUBLICATIONS

Ghias et al., "Voltage Balancing Strategy for a Five-Level Flying Capacitor Converter Using Phase Disposition PWM With Sawtooth-Shaped Carriers";IECON 2012—38$^{th}$ Annual Conf., IEEE Industrial Electronics Society; Oct. 25, 2012; pp. 5013-5019.

Maia et al., "Associating PWM and Balancing Techniques for Performance Improvement of Flying Capacitor Inverter"; 2013 Brazilian Power Electronics Conf., IEEE; Oct. 27, 2013; pp. 92-99.

Rodriguez et al., "Multilevel Inverters: A Survey of Topologies, Controls, and Applications", IEEE Transactions on Industrial Electronics, vol. 49, No. 4, Aug. 2001, pp. 724-738.

Abu-Rub, "Medium-Voltage Multilevel Converters—State of the Art, Challenges, and Requirements in Industrial Applications", IEEE Transactions on Industrial Electronics, vol. 57, N. 8, Aug. 2010, pp. 2581-2596.

Peng, "A Generalized Multilevel Inverter Topology with Self Voltage Balancing", IEE Transactions on Industry Applications, vol. 37, No. 2, Mar./Apr. 2001, pp. 611-618.

Choi et al., "A General Circuit Topology of Multilevel Inverter", Power Electronics Specialists Conference, 1991, PESC '92 Record., 22$^{nd}$ Annual IEEE, Jun. 24-27, 1991, 8 pgs.

Zhang et al., "A Multilevel Converter Topology with Common Flying Capacitors", IEEE, 2013, pp. 1274-1280.

Akagi et al., "A Passive EMI Filter for Eliminating Both Bearing Current and Ground Leakage Current From an Inverter-Driven Motor", IEEE Transactions on Power Electronics, 2006, pp. 1459-1469.

Akagi et al., "An Approach to Eliminating High-Frequency Shaft Voltage and Ground Leakage Current From an Inverter-Driven Motor", IEEE Transactions on Industry Applications, 2004, pp. 1162-1169.

ALTIVAR 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

Barbosa et al., "Active neutral-point-clamped multilevel converters," in Proc. IEEE 36th Power Electron. Spec. Conf., Jun. 16, 2005, pp. 2296-2301.

Bruckner et al., "The active NPC converter and its loss-balancing control," IEEE Trans. Ind. Electron., vol. 52, No. 3, pp. 855-868, Jun. 2005.

Cacciato et al., "Modified space-vector-modulation technique for common mode currents reduction and full utilization of the DC bus", in Proc. IEEE APEC Conf. Rec., 2009, pp. 109-115.

Cacciato et al., "Reduction of common mode currents in PWM inverter motor drives", IEEE Trans. Ind. Appl., vol. 35, No. 2, pp. 469-476, Mar./Apr. 1999.

Cavalcanti et al., "Modulation Techniques to Eliminate Leakage Currents in Transformerless Three-Phase Photovoltaic Systems", IEEE Transactions on Industrial Electronics, 2010, pp. 1360-1368.

Cengelci, E., et al., A New Medium Voltage PWM Inverter Topology for Adjustable Speed Drives, IEEE, 0-7803-4943-1, 1998, pp. 1416-1423.

Cha, Han Ju et al. An Approach to Reduce Common-Mode Voltage in Matrix Converter, Jul./Aug. 2003, IEEE, vol. 39, pp. 1151-1159.

Cha, Han Ju, "Analysis and Design of Matrix Converter for Adjustable Speed Drive and Distributed Power Sources", Aug. 2004, Texas A&M Univ., Doctor of Philosophy Dissertation Paper.

Chaudhuri, Toufann, et al., Introducing the Common Cross Connected Stage ($C^3S$) for the 5L ANPC Multilevel Inverter, IEEE, 978-1-4244-1668-4, 2008, pp. 167-173.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Erdman, Russel J. Kerkman, David W. Schlegel, and Gary L. Skibinski, "Effect of PWM Inverters on AC Motor Bearing Currents and Shaft Voltages", 1996 IEEE.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Floricau, Dan et al., A new stacked NPC converter: 3L-topology and control, Proceedings of the 12$^{th}$ European Conf. on Power Electronics and Applications, EPE 2007, EPE Association, 2007, 10 pgs.

Glinka, M., Prototype of Multiphase Modular-Multilevel-Converter with 2 MW power rating and 17-level-output-voltage, IEEE, 0-7803-8399-0, 2004, pp. 2572-2576.

Guennegues et al., "Selective harmonic elimination PWM applied to H-bridge topology in high speed applications," in Proc. Int. Conf. POWERENG, Mar. 18-20, 2009, pp. 152-156.

Guennegues, V., et al., A Converter Topology for High Speed Motor Drive Applications, IEEE Xplore, 2009, 8 pgs.

Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.

Hava et al., "A high-performance PWM algorithm for common-mode voltage reduction in three-phase voltage source inverters," IEEE Trans. Power Electron., vol. 26, No. 7, pp. 1998-2008, Jul. 2011.

Hiller, Mark et al., Medium-Voltage Drives; An overview of the common converter topologies and power semiconductor devices, IEEE Industry Applications Magazine, Mar.-Apr. 2010, pp. 22-30.

Horvath, "How isolation transformers in MV drives protect motor insulation", TM GE Automation Systems, Roanoke, VA, 2004.

Hua, Lin, "A Modulation Strategy to Reduce Common-Mode Voltage for Current-Controlled Matrix Converters", Nov. 2006, IEEE Xplore, pp. 2775-2780.

Iman-Eini, Hossein et al., "A Fault-Tolerant Control Strategy for Cascaded H-Bridge Multilevel Rectifiers", Journal of Power Electronics, vol. 1, Jan. 2010.

Kerkman, et al., "PWM Inverters and Their Influence on Motor Over-Voltage," 1997 IEEE.

Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.

Kieferndorf et al., "A new medium voltage drive system based on anpc-5l technology," in Proc. IEEE-ICIT, Viña del Mar, Chile, Mar. 2010,pp. 605-611.

Kouro et al., "Recent advances and industrial applications of multilevel converters," IEEE Trans. Ind. Electron., vol. 57, No. 8, pp. 2553-2580, Aug. 2010.

Lai et al., "Optimal common-mode voltage reduction PWM technique for inverter control with consideration of the dead-time effects—part I: basic development," IEEE Trans. Ind. Appl., vol. 40, No. 6, pp. 1605-1612, Nov./Dec. 2004.

Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.

Lesnicar et al., "An Innovative Modular Multilevel Converter Topology Suitable for a Wide Power Range", 2003 IEEE Bologna PowerTech Conference, Jun. 23-26, Bologna Italy, 6 pgs.

Lesnicar, A., et al., A new modular voltage source inverter topology, Inst. of Power Electronics and Control, Muenchen, DE, Oct. 10, 2007, pp. 1-10.

Lezana, Pablo et al., "Survey on Fault Operation on Multilevel Inverters", IEEE Transactions on Industrial Electronics, vol. 57, No. 7, Jul. 2010, pp. 2207-2217.

(56) References Cited

OTHER PUBLICATIONS

Li, Jun, et al., A New Nine-Level Active NPC (ANPC) Converter for Grid Connection of Large Wind Turboines for Distributed Generation, IEEE Transactions on Power Electronics, vol. 26, No. 3, Mar. 2011, pp. 961-972.
McGrath, Brendan Peter et al., "Multicarrier PMW Strategies for Multilevel Inverters," IEEE Transactions on Industrial Electronics, vol. 49, No. 4, pp. 858-867, Aug. 2002.
Meili et al., "Optimized pulse patterns for the 5-level ANPC converter for high speed high power applications," in Proc. 32nd IEEE IECON, Nov. 6-10, 2006, pp. 2587-2592.
Muetze & A. Binder, "Don't lose Your Bearings, Mitigation techniques for bearing currents in inverter-supplied drive systems", 2006 IEEE.
Naik et al., "Circuit model for shaft voltage prediction in induction motors fed by PWMbased AC drives", IEEE Trans. Ind. Appl., vol. 39, No. 5, pp. 1294-1299, Nov./Dec. 1996.
O-Harvest, product information, Beijing Leader & Harvest Electric Technologies Co., Ltd., http:/www.ld-harvest.com/en/3-1-2.htm, retrieved from the Internet Apr. 11, 2013, 3 pgs.
Park, Young-Min, "A Simple and Reliable PWM Synchronization & Phase-Shift Method for Cascaded H-Bridge Multilevel Inverters based on a Standard Serial Communication Protocol", IEEE $41^{st}$ IAS Annual Meeting, pp. 988-994, Oct. 2006.
Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.
Rendusara, et al., "Analysis of common mode voltage—'neutral shift' in medium voltage PWM adjustable speed drive (MV-ASD) systems", IEEE Trans. Power Electron., vol. 15, No. 6, pp. 1124-1133, Nov. 2000.
Rubicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web Part 1, pp. 1-49; and Part 2, pp. 50-91).
Robicon Perfect Harmony, "The Drive of Choice for Highest Demands", Siemens, Copyright Siemens AG 2008, 16 pgs, .obtained from the World Wide Web Apr. 2013.
Robicon, "Perfect Harmony MV Drive Product Overview", 18 pgs . . . obtained from the World Wide Web Apr. 2013.
Rodriguez et al., "A New Modulation Method to Reduce Common-Mode Voltages in Multilevel Inverters", IEEE Transactions on Industrial Electronics, vol. 51, No. 4, Aug. 2004, 834-939.
Rodriguez et al., "Multilevel inverters: A survey of topologies, controls, and applications," IEEE Trans. Ind. Electron., vol. 49, No. 4, pp. 724-738, Aug. 2002.
Rodriguez et al., "Operation of a Medium-Voltage Drive Under Faulty Conditions", IEEE Transactions on Industrial Electronics, vol. 52, No. 4, Aug. 2005, pp. 1080-1085.
Rodriguez, et al., "Multilevel voltage source-converter topologies for industrial medium-voltage drives," IEEE Trans. Ind. Electron., vol. 54, No. 6, pp. 2930-2945, Dec. 2007.
Saeedifard, et al., "Operation and control of a hybrid seven-level converter," IEEE Trans. Power Electron., vol. 27, No. 2, pp. 652-660, Feb. 2012.
Saeedifard, Maryann et al., Analysis and Control of DC-Capacitor-Voltage-Drift Phenomenon of a Passive Front-End Five-Level Converter, IEEE Transactions on Industrial Electronics, vol. 54, No. 6, Dec. 2007, pp. 3255-3266.
Sedghi, S. et al., "A New Multilevel Carrier Based Pulse Width Modulation Method for Modular Multilevel Inverter", IEEE, $8^{th}$ International Conference on Power Electronics—ECCE Asia (ICPE & ECCE), pp. 1432-1439, May 30-Jun. 3, 2011.
Sepahvand, Hossein et al., "Fault Recovery Strategy for Hybrid Cascaded H-Bridge Multi-Level Inverters", 2011 IEEE, pp. 1629-1633.
Serpa et al., "Fivelevel virtual-flux direct power control for the active neutral-point clamped multilevel inverter," in Proc. IEEE Power Electron. Spec. Conf.
Silva, Cesar et al., Control of an Hybrid Multilevel Inverter for Current Waveform Improvement, IEEE, 978-1-4244-1666-0, 2008, pp. 2329-2335.
Song, Wenchao et al., "Control Strategy for Fault-Tolerant Cascaded Multilevel Converter based STATCOM", 2007 IEEE, pp. 1073-1076.
Ulrich, James A., et al., Floating Capacitor Voltage Regulation in Diode Clamped Hybrid Multilevel Converters, IEEE, 978-1-4244-3439-8, 2009, pp. 197-202.
Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.
Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.
Wei, Sanmin et al., "Control Method for Cascaded H-Bridge Multilevel Inverter with Faulty Power Cells", 2003 IEEE, pp. 261-267.
Wen, Jun et al., Synthesis of Multilevel Converters Based on Single-and/or Three-Phase Converter Building Blocks, IEEE Transactions on Power Electronics, vol. 23, No. 3, May 2008, pp. 1247-1256.
Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.
Wu, Bin, "EE8407 Power Converter Systems", Topic 6, Multilevel Cascaded H-Bridge (CHB) Inverters, pp. 1-14, 2006.
Wu, Bin, "High-Power Converters and AC Drives", Wiley—IEEE Press, 2006, Chapter 7, pp. 119-142.
Wu, Bin, "High-Power Converters and AC Drives", Wiley—IEEE Press, 2006, Chapter 9, pp. 179-186.
Wu, High-Power Converters and AC Drives. New York/Piscataway, NJ: Wiley/IEEE Press, 2006, Ch. 1.
Yantra Harvest Energy Pvt. Ltd., "Medium Voltage Drives", www.yantraharvest.com, obtained from the World Wide Web Apr. 2013.
Yin, et al., "Analytical Investigation of the Switching Frequency Harmonic Characteristic for Common Mode Reduction Modulator", 2005 IEEE.
Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012 , pp. 1152-1158.
Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.
Zhu et al., An Integrated AC Choke Design for Common-Mode Current Suppression in Neutral-Connected Power Converter Systems. IEEE Transactions on Power Electronics, 2012 , pp. 1228-1236.
Loh et al., "Reduced Common-Mode Modulation Strategies for Cascaded Multilevel Inverters"; IEEE Transactions on Industry Applications; IEEE Service Center, Piscataway, NJ; vol. 39, No. 5; Sep. 1, 2003; pp. 1386-1395.
Zhang et al., "Multilevel Inverter Modulation Schemes to Eliminate Common-Mode Voltages"; IEEE Transactions on Industry Applications; IEEE Service Center, Piscataway, NJ; vol. 36, No. 6; Nov. 1, 2000; pp. 1645-1653.
Kim et al., "A New PWM Strategy for Common-Mode Voltage Reduction in Neutral-Point-Clamped Inverter-Fed AC Motor Drives"; IEEE Transactions on Industry Applications; IEEE Service Center, Piscataway, NJ; vol. 37, No. 6; Nov. 11, 2001; pp. 1840-1845.
Celanovic et al., "A Comprehensive Study of Neutral-Point Voltage Balancing Problem in Three-Level Neutral-Point-Clamped Voltage Source PWM Inverters"; IEEE Transactions on Power Electronics, Institute of Electrical and Electronics Engineers; vol. 15, No. 2; Feb. 1, 2000, pp. 242-249.

* cited by examiner

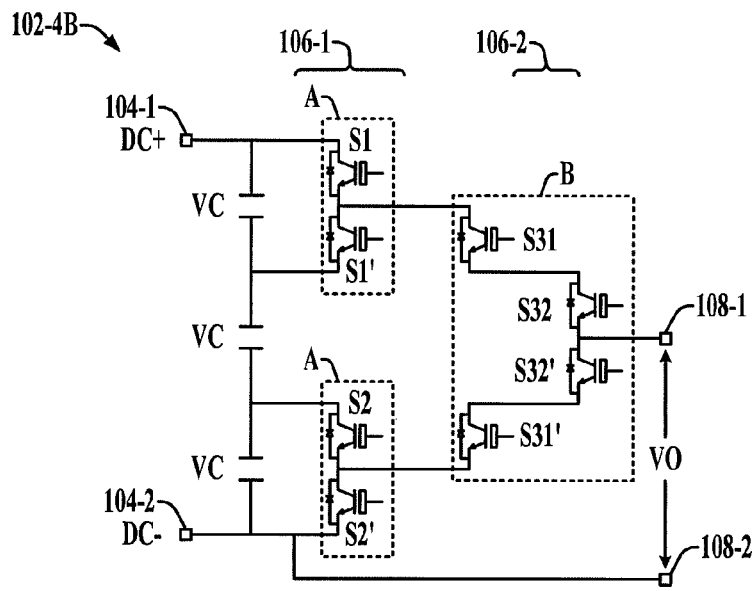

FIG. 3

| | STATE 4 VO = 3VC | STATE 3 VO = 2VC | STATE 2 VO = VC | STATE 1 VO = 0 |
|---|---|---|---|---|
| S1 | ON, CONDUCTING | OFF, BLOCK VC | OFF, BLOCK VC | OFF, BLOCK VC |
| S1' | OFF, BLOCK VC | ON, CONDUCTING | ON, CLAMPING | ON, CLAMPING |
| S2 | ON, CLAMPING | ON, CLAMPING | ON, CONDUCTING | OFF, BLOCK VC |
| S2' | OFF, BLOCK VC | OFF, BLOCK VC | OFF, BLOCK VC | ON, CONDUCTING |
| S31 | ON, CONDUCTING | ON, CONDUCTING | OFF, BLOCK VC | OFF, BLOCK 2VC |
| S31' | OFF, BLOCK 2VC | OFF, BLOCK VC | ON, CONDUCTING | ON, CONDUCTING |
| S32 | ON, CONDUCTING | ON, CONDUCTING | OFF, BLOCK VC | OFF, BLOCK 2VC |
| S32' | OFF, BLOCK 2VC | OFF, BLOCK VC | ON, CONDUCTING | ON, CONDUCTING |

FIG. 4

SPARSE MATRIX MULTILEVEL ACTIVELY CLAMPED POWER CONVERTER

BACKGROUND

The subject matter disclosed herein relates to power conversion, and more specifically to sparse matrix multilevel motor drives and other power converters.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides sparse matrix multilevel actively clamped converters stages providing an integer number L output levels with no flying capacitors and no more than $L*(L-1)$ switching devices which may be operated to select different voltage levels from a common DC link in order to provide multilevel output waveforms at the output.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIGS. 1-3 are schematic diagrams;
FIG. 4 is a switching state table.

DETAILED DESCRIPTION

Various embodiments are hereinafter illustrated and described, wherein the disclosure is not limited to the specific examples shown and described. Multilevel power converters are a preferred solution to medium voltage high power conversion for many reasons including high-quality waveforms and optimal semiconductor costs compared with conventional inverter designs. A sparse matrix multilevel converter architecture approach is presented hereinafter for providing multilevel waveforms without requiring isolated DC sources or floating capacitors with reduced or even minimal number of semiconductor devices. Cascaded H-Bridge (CHB) converters provide a low voltage (LV) modular solution with good waveform quality at both input and output, but require a large number of isolated DC sources and rectifiers, as well as a complicated transformer and thus suffer from poor power density. Flying capacitor clamped (FCC) inverters need only single DC source, but require a large number of flying or floating DC storage capacitors which often need special charging and balancing control circuitry. FCC inverters also have limited performance at low speed and generally lack modularity. Modular multilevel converters (MMC) use many identical LV modules connected in series to a common DC bus. However, the MMC topology requires large number of flying capacitors which are prone to circulating current, require charging and voltage balancing, and suffer from limited performance in low-speed, high-torque applications. Multilevel Neutral Points Clamped (NPC) converters do not use floating capacitors but require large numbers of semiconductors and lack modularity. Full matrix multilevel actively clamped (MAC) converters also do not use flying capacitors and provide some level of modularity. MAC converters, however, require large numbers of semiconductors, although the number of devices is somewhat less than multilevel NPC designs. Multilevel-clamped converters (MLC2) eliminate floating capacitors and provide modularity but may have switching devices with different voltage ratings depending on voltage levels.

Figure 1:
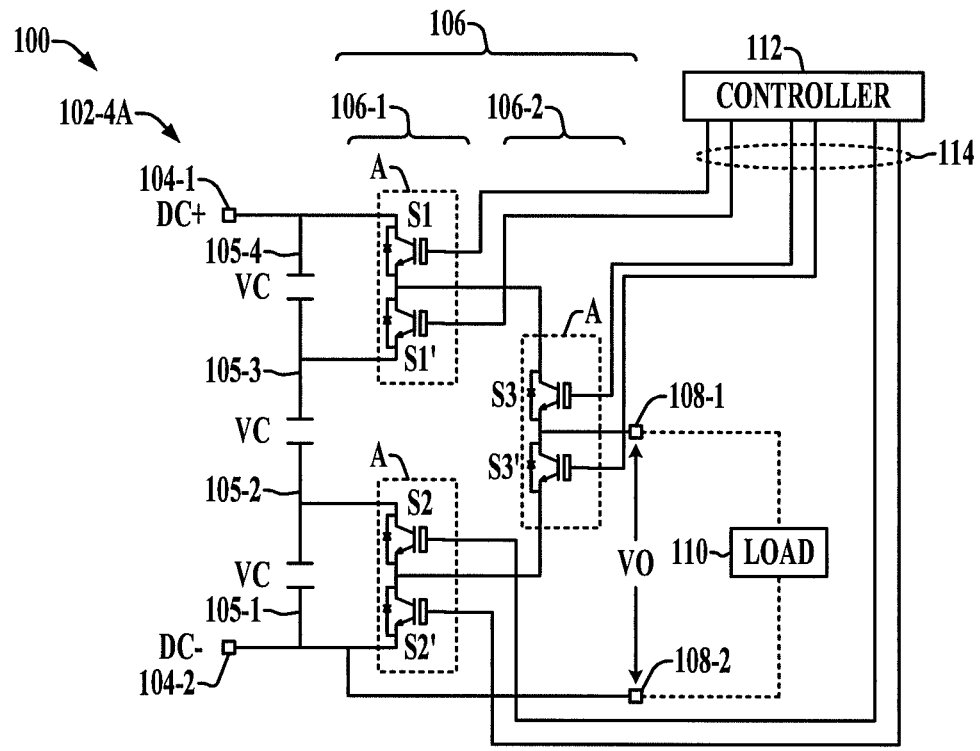
Figure 2:
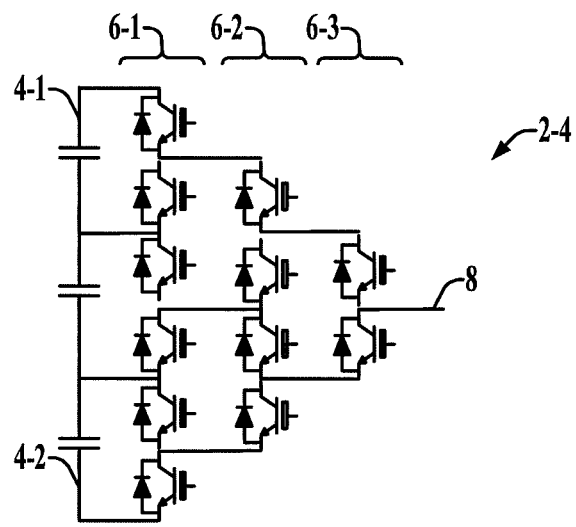

Referring initially to FIGS. 1 and 2, the disclosed power converter stage configurations 102 and power conversion systems 100 can be advantageously employed to facilitate provision of multilevel converter output levels without requiring the complex isolation transformer secondaries associated with CHB converters, and without floating capacitors and the capacitor voltage balancing problems of FCC designs, while facilitating high voltage applications with the performance benefits of MAC converters without requiring large numbers of semiconductor devices. It will be noted that disclosed examples may include other non-floating capacitors, such as DC input capacitors and/or snubber capacitors associated with individual switching devices, which are not floating or flying capacitors as used herein.

FIG. 1 illustrates a power conversion system 100 including a four-level sparse matrix actively clamped (SMAC) power converter stage 102-4A. The converter stage 102-4A can be employed as part of any power conversion system 100, including without limitation a motor drive. Furthermore, although the power converter stage 102-4A provide a single phase output voltage VO, the disclosed sparse matrix actively clamped converter stages 102 may be used in H-bridge type configurations using more than one converter stage 102 to provide a single phase output voltage in certain embodiments, and/or other embodiments can use multiple sparse matrix stages 102 in order to provide a multiphase output, for example, to drive a motor or other multiphase load. The converter stage 102-4A in FIG. 1 comprises first and second DC inputs 104-1 (DC+) and 104-2 (DC−) as well as an integer number N capacitors or DC voltage sources coupled in series between the DC inputs 104 to provide an integer number L=M+1 converter stage DC voltage nodes 105-1, 105-2, 105-3 and 105-4, where N=3 and L=4 in this four-level example. The stage 102-4A provides an output voltage VO between first and second converter output nodes 108-1 and 108-2, where the output voltage at the output node 108-1 is with respect to the lower DC input node 104-2 (DC−) in this single phase example.

The sparse matrix stage 102-4A also includes a switching circuit 106 with no more than $L*(L-1)$ switching devices "S", in this case using only six switching devices S1, S1', S2, S2', S3 and S3', and the switching circuit 106 has no capacitors (i.e., no flying or floating capacitors). The switching circuit 106, moreover, includes an integer number M switching stage circuits, in this case first and second switching stage circuits 106-1 and 106-2, where M=2, each of which including one or more single pole double throw (SPDT) switch cell circuits labeled "A" in the drawing. A controller 112 provides switching control signals 114 for operating the switches S of the switching circuit 106 to provide the output voltage VO by selectively electrically coupling the converter stage output node or terminal 108-1 with a single one of the L converter stage DC voltage nodes 105 at any given time so as to provide one of L distinct voltage levels to drive a load 110 at the stage output 108. In this example (L=4), the stage 102-4A provides one of four distinct output voltage levels generally equal to 0, 1, 2, or 3 times the voltage VC across the DC capacitors, where the capacitors in this example are of equal values. In other embodiments, the capacitors connected in series between the DC input nodes 104 need not be of equal capacitance values, and the distinct output levels provided by the converter stage 102-4A need not be equally spaced.

In contrast to the sparse matrix converter stage 102 of FIG. 1, FIG. 2 illustrates a four-level full matrix actively clamped converter stage 2-4, with three capacitors disposed between DC inputs 4-1 and 4-2, with three switching stages 6-1, 6-2 and 6-3 using a total of 12 switching devices coupled between the DC inputs 4 and a stage output terminal 8. In the examples of FIGS. 1 and 2, therefore, the four-level sparse matrix stage 102-4A achieves the same number of output levels as the full matrix example 2-4 of FIG. 2 using half the number of switching devices S. In addition, the power converter stage 102-4A of FIG. 1 does not include any flying or floating capacitors, and accordingly does not suffer from the precharging and voltage balancing issues experienced in flying capacitor multilevel converters. Moreover, unlike flying capacitor systems, the sparse matrix converter stage 102-4A of FIG. 1 and the other sparse matrix converters 102 disclosed herein mitigate or avoid the low-speed performance issues found in conventional flying capacitor systems. In addition, these performance advantages are achieved while significantly reducing the number of switching devices in the converter stage 102, particularly compared with full matrix configurations. In this regard, any suitable switching devices S can be used in the sparse matric converter stages 102, including without limitation IGBTs, IGCTs, MOSFETs, etc. In addition, as further shown below, SMAC converter stages or legs of any levels (e.g., L>3) can be used to form an H-bridge that can be connected in series to form a cascaded H-bridge (CHB) leg for single or multiphase power conversion systems 100.

FIGS. 3 and 4 illustrate a second non-limiting example 4-level sparse matrix actively clamped power converter stage 102-4B, in this case including eight switching devices S1, S1', S2, S2', S31, S31', S32 and S32', again including first and second switching stage circuits 106-1 and 106-2 (M=2). In this case, the final switching stage circuit 106-2 includes a single pole double throw switch cell circuit labeled "B", constructed using four switching devices S31, S31', S32 and S32' to share the voltage stress so that all the switching devices have the same voltage rating. In this cell circuit B, switches S31 and S32 are turned on and off together and the switches S31' and S32' are turned on and off together to implement a single pole double throw cell circuit B with the output node 108-1 forming a single pole and a pair of throw nodes connected to individual poles of the two-device single pole double throw cell circuits A of the first switching stage circuit 106-1 as shown in FIG. 3.

FIG. 4 illustrates a switching state table 109 showing one non-limiting set of possible switching states for the eight switching devices S1, S1', S2, S2', S31, S31', S32 and S32' in FIG. 3, with a controller (e.g., controller 112 in FIG. 1) providing suitable switching control signals (e.g., 114 in FIG. 1) to operate the converter stage switching devices S accordingly to provide one of four possible output voltage states (L=4). As seen in FIG. 4, switching states ("ON" or "OFF") are shown for each of the eight switching devices for each of four converter stage output states: STATE 1 with the switching circuit 106 electrically coupling the converter stage output node 108-1 with the converter stage DC voltage node 105-1 to provide a zero output voltage (VO=0) relative to the DC− node 104-2; STATE 2 with the output node 108-1 coupled with the DC voltage node 105-2 (VO=VC); STATE 3 with the output node 108-1 coupled with the DC voltage node 105-3 (VO=2VC); and STATE 4 for electrically coupling the output node 108-1 with the converter stage DC voltage node 105-4 (VO=3VC). As seen in the state table 109, moreover, certain switch "ON" states of a given switch S may provide for conduction (e.g., switch S1' in state 3), and others for clamping (e.g., S1' in state 2). Also, certain "OFF" states provide for blocking a single capacitor voltage VC (e.g., S2 in state 1), and certain "OFF" conditions provide for blocking 2VC (e.g., S31 in-state 1).

Any suitable controller 112 can be used in the various embodiments, including one or more processors, programmable logic, fixed logic circuits, etc., and having driver circuitry to provide switching control signals 114 suitable to selectively turn the individual switching devices on and off to operate the switching circuit 106.

Figure 5:
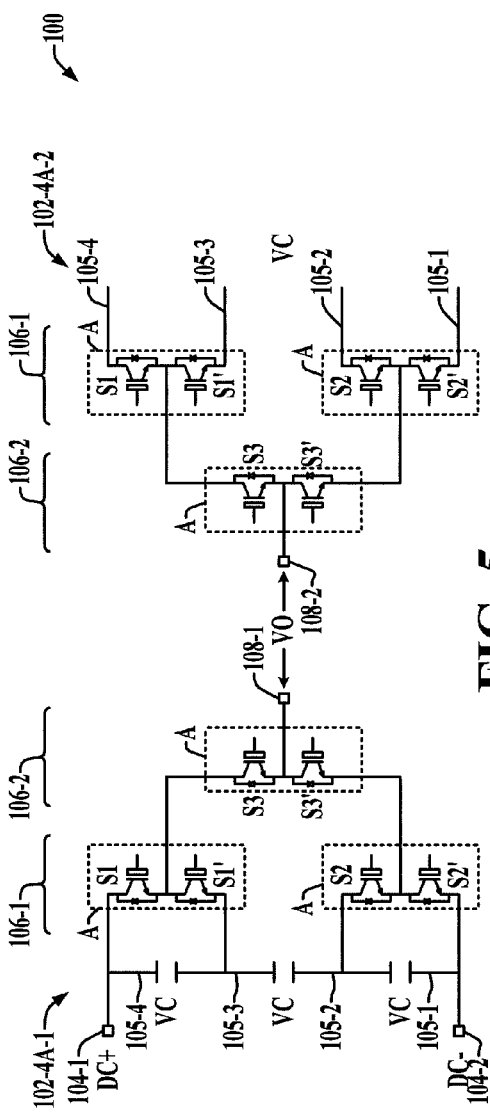
FIGS. 5-15 are schematic diagrams.
Figure 6:
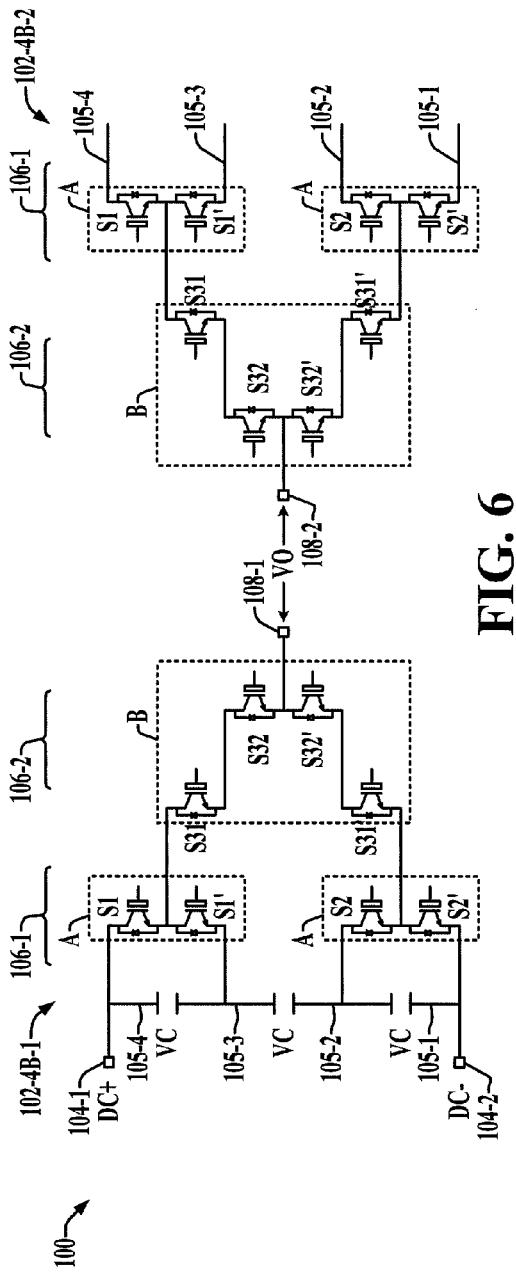

Referring also to FIGS. 5 and 6, FIG. 5 illustrates an "H-bridge" configuration of two power converter stages 102-4A-1 and 102-4A-2, each of which is constructed of six switching devices configured as three single pole double throw cell circuits A (e.g., similar to the cell 102-4A of FIG. 1 above). In this case, the output voltage VO is established between the output nodes 108-1 and 108-2 of the corresponding converter stages 102-4A-1 and 102-4A-2, with a corresponding controller (not shown) providing switching control signals to the switching devices S of the stages 102-4A-1 and 102-4A-2 to selectively connect the terminal 108-1 with a selected one of the converter stage DC voltage nodes 105-1 . . . 105-4, and to selectively connect the terminal 108-2 of the other stage 102-4A-2 with one of the converter stage DC voltage nodes 105-1 . . . 105-4. In this manner, controlled operation of the switching circuits 106 of the first and second stages 102-4A-1 and 102-4A-2 allows controlled provision of an output voltage VO between the output nodes 108-1 and 108-2 at one of 2L−1 distinct voltage levels (e.g., seven distinct output voltage levels in this example). In certain embodiments, the DC link capacitor bank is shared by the two H-bridge stages 102-4A-1 and 102-4A-2 and the converter DC inputs 104 of the two stages are connected to a common DC bus. In other embodiments, the each DC converter stage has its own DC link capacitor bank and the converter stage DC inputs 104 are connected to different DC supplies.

The FIG. 6 illustrates another H-bridge embodiment using first and second power converter stages 102-4B-1 and 102-4B-2, each having a pair of two-device single pole double throw cell circuits A and a four-device single pole double throw cell circuit B, as described above in connection with the converter stage 102-4B of FIG. 3. As with the H-bridge example of FIG. 5, the conversion system in FIG. 6 provides an output voltage VO between the output nodes 108-1 and 108-2, with the switches S being selectively operable according to suitable switching control signals to provide the output voltage VO at one of seven distinct voltage levels. It is noted in FIGS. 5 and 6 that multiple H-bridge arrangements can be vertically cascaded with outputs connected in a series circuit to form a cascaded H-Bridge (CHB) structure, for example, for higher output voltages, lower device voltage ratings and/or improved waveform quality. In addition, SMAC legs of any levels (e.g., any "L" greater than 3)

can be used to form an H-bridge that can be connected in series to form a CHB leg for single or multiphase systems.

Figure 7:
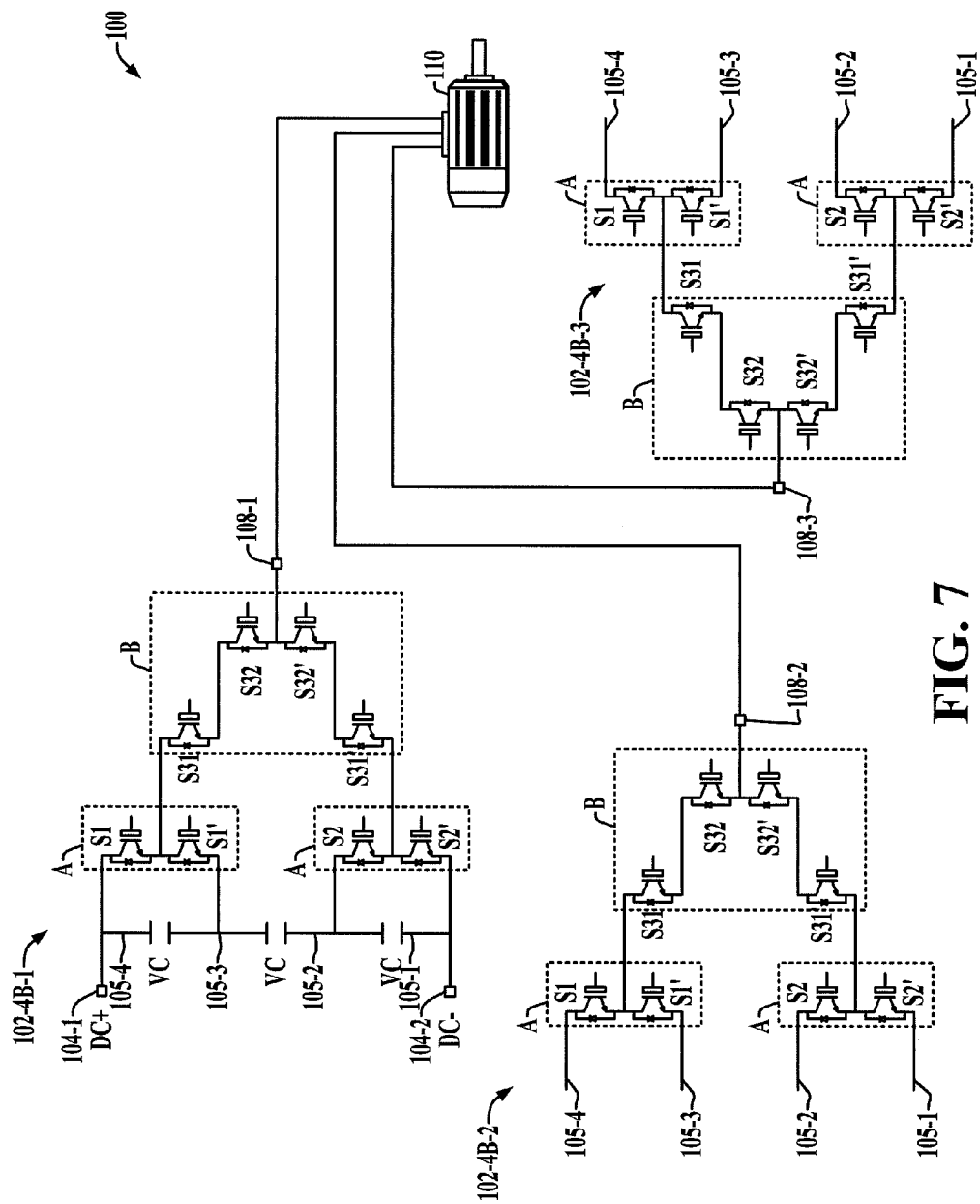

FIG. 7 illustrates a three phase power conversion system 100 including first, second and third power converter stages 102-4B-1, 102-4B-2 and 102-4B-3, each having a corresponding output terminal 108-1, 108-2 and 108-3 coupled with a terminal of a motor load 110. In this configuration, the individual stages 102-4 are each four-level power stages as illustrated and described above in FIG. 3, and the DC link capacitor bank is shared by the converter stages of all phases with the converter stage DC inputs 104 connected to a common DC bus in certain embodiments, or each converter stage can be supplied by separate DC voltage supplies in other embodiments. The three-phase system allows individual control of the corresponding converter stages 102-4B-1, 102-4B-2 and 102-4B-3 by provision of suitable switching control signals to provide seven distinct line-line voltage levels to the motor load 110.

Figure 8:
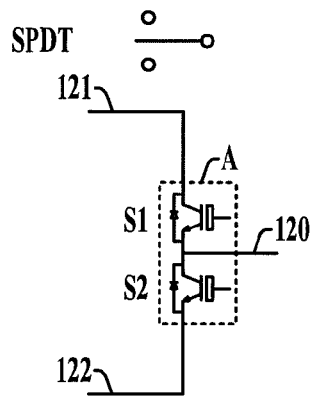
Figure 9:
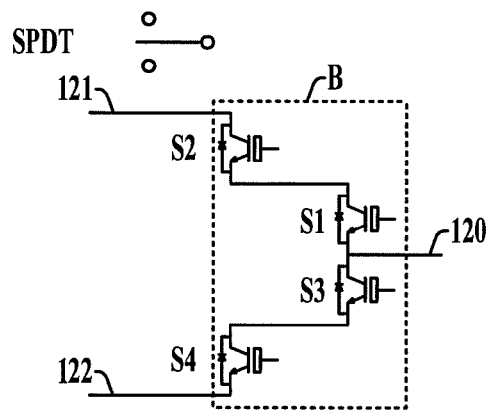

Referring now to FIGS. 8-11, sparse matrix actively clamped power converters 102 of the present disclosure can be constructed using various cell circuit configurations as building blocks, non-limiting examples of which are shown in FIGS. 8-11. FIG. 8 shows a two-device single pole double throw (SPDT) circuit A having a pole terminal 120 and a pair of throw terminals 121 and 122 which can be interconnected with other cell circuits in a switching stage circuit (e.g., 106-1 ... 106-M) to form a switching circuit 106 of a sparse matrix power conversion stage 102 (e.g., FIGS. 1, 3 and 5 above). Another single pole double throw cell circuit embodiment B is shown in FIG. 9, in this case including four switching devices, or two pairs connected in series respectively to share the voltage stress (e.g., FIGS. 3 and 6 above).

Figure 10:
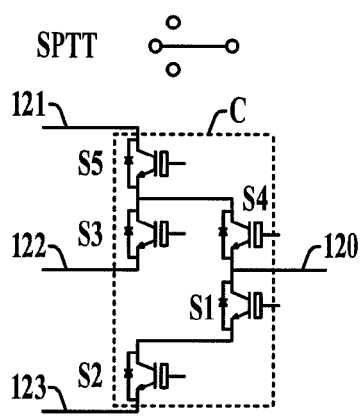
Figure 11A:
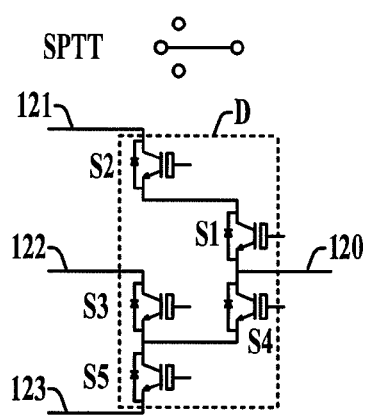
Figure 11B:
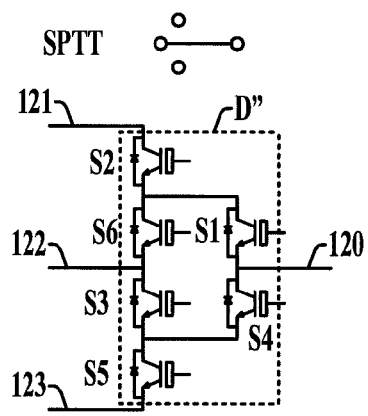
Figure 20:
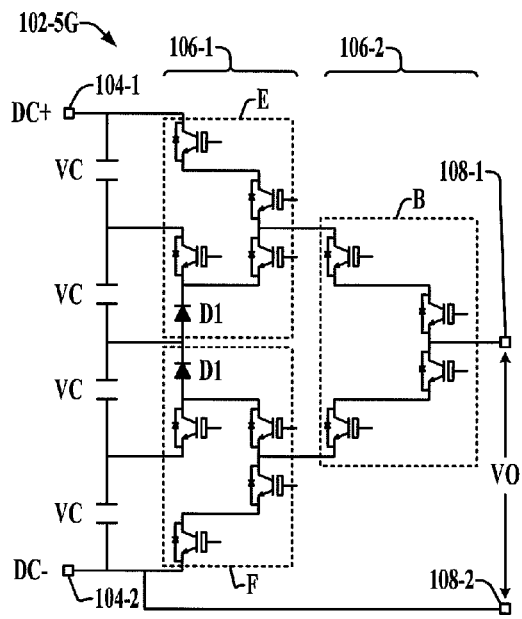
Figure 21:
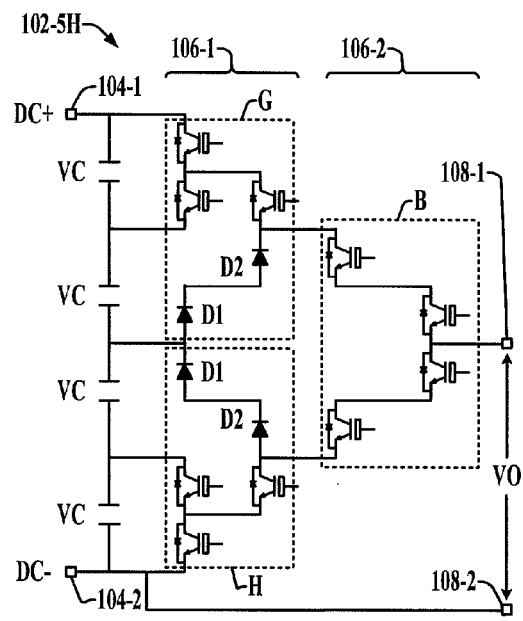

As further shown in FIGS. 10, 11A and 11B, moreover, certain sparse matrix actively clamped power converter stages 102 of the present disclosure further incorporate one or more interchangeable single pole triple throw (SPTT) switching cell circuits C (FIG. 10), D and/or D" (FIGS. 11A and 11B). In this regard, the examples of FIGS. 10 and 11A include single pole triple throw switches implemented using five switching devices S1-S5, and the example single pole triple throw switch in FIG. 11B includes a full set of six switching devices S1-S6. These cell circuits C, D and D" (as well as the further embodiments E, F in FIG. 20 and cell circuits G and H in FIG. 21 below) each have a single pole terminal or node 120 as well as three throw terminals or nodes 121, 122 and 123. As shown in the single pole triple throw cell circuit C in FIG. 10, for example, first and second switches S1 and S2 are coupled in series with one another between the pole terminal 120 and the throw terminal 123, with third and fourth switches S3 and S4 coupled in series with one another between the throw terminal 122 and the pole terminal 120. In addition, a fifth switching device S5 is coupled between the other throw terminal 121 and the fourth switch S4. Unlike a full matrix single pole triple throw circuit D", moreover, the example SPTT circuits C and D of FIGS. 10 and 11 include only five switching devices S1-S5. It is further noted in FIGS. 10 and 11A that the SPTT cell circuits C and D are vertically inverted or flipped with respect to one another, with the cell circuit D having S1 and S2 connected between the pole 120 and the first throw node 121, with S3 and S4 connected between the pole 120 and the second throw node 122, and S5 connected between S4 and the third throw terminal 123 as shown in FIG. 11A. In various implementations of higher order SMAC power converter stages, a variety of different SPTT cells can be used in any order or can be flipped vertically in any positions. Moreover, as seen in FIGS. 20 and 21 below, any switching devices or series of switching devices that are connected directly to the middle point of odd L (even N) converter stages 102 can be replaced by diodes in certain embodiments.

Figure 12:
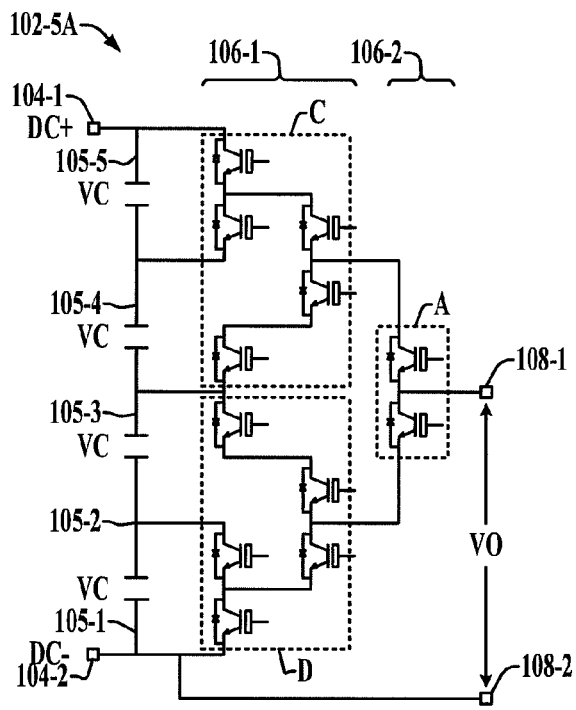

Referring now to FIGS. 12-22, and various non-limiting five-level (L=5) sparse matrix actively coupled power converter stages 102-5 are illustrated. FIG. 12 shows one embodiment 102-5A having N=4 capacitors each charged in steady state operation to equal capacitor voltages VC, with a switching circuit 106 including M=2 switching stage circuits 106-1 and 106-2. In this example, the first switching stage circuit 106-1 includes two single pole triple throw cell circuits including a circuit C above a cell circuit D in the first switching stage circuit 106-1, where the cell circuits C and D are coupled with the converter stage DC voltage nodes 105. The second switching stage circuit 106-2 includes a single two-device single pole double throw cell circuit A coupled between the preceding cell circuits C, D and the output terminal 108-1. As seen, the sparse matric converter stage embodiment 102-5A includes no more than L*(L−1) switching devices, in this case only using 12 switches and no flying or floating capacitors. Moreover, selective operation of the switches S in this embodiment provide for five distinct output voltage levels at the output terminal 108-1 relative to the lower DC node DC−.

Figure 13:
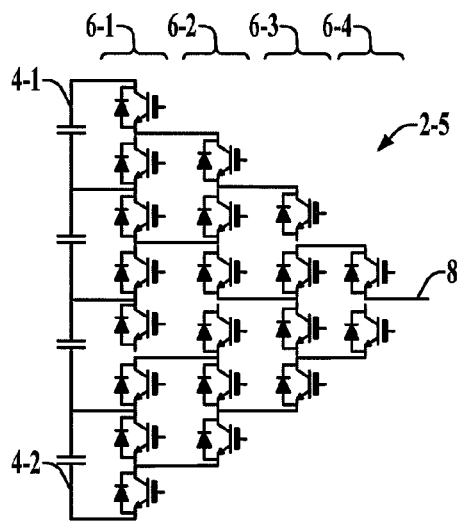

In contrast, a full matrix five-level circuit 2-5 shown in FIG. 13 includes four horizontal stages and a total of 20 switches. Thus, the sparse matrix approach of FIG. 12 provides significant cost, space and power consumption savings compared with the full matrix circuit of FIG. 13. Moreover, the same or similar performance can be achieved in providing L=5 distinct output voltage levels, without the precharging and imbalance problems of flying capacitor architectures.

Figure 14:
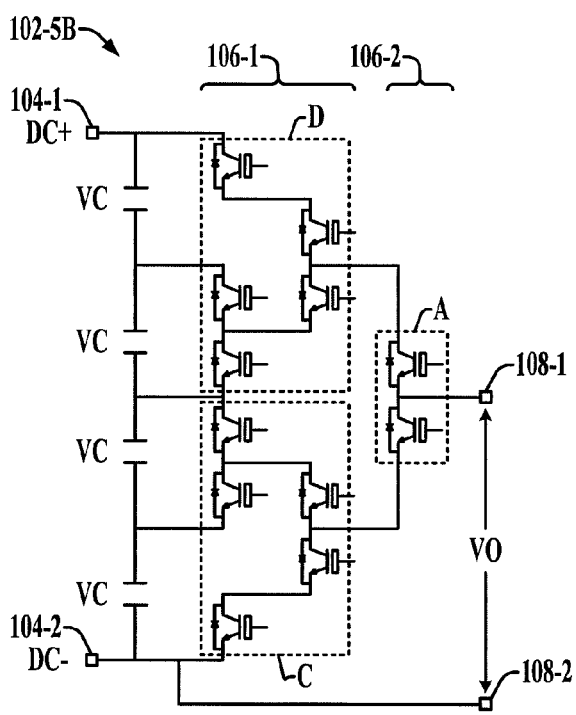

FIG. 14 illustrates an alternate five-level sparse matrix converter stage 102-5B, using an upper cell circuit D and a lower cell circuit C in the first switching stage circuit 106-1, and a two-device single pole double throw circuit A in the second switching stage circuit 106-2.

Figure 15:
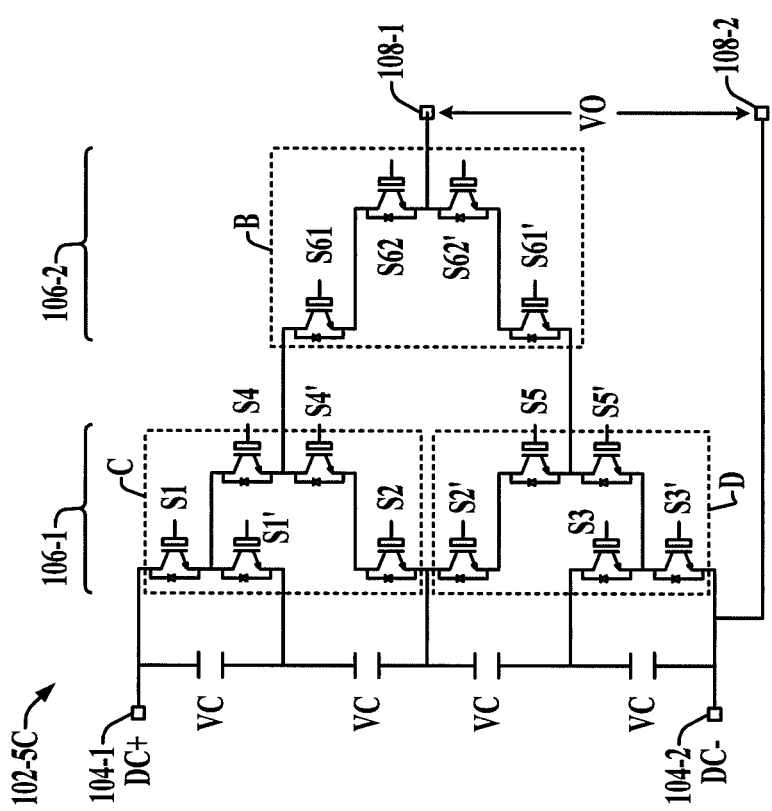
Figure 16:
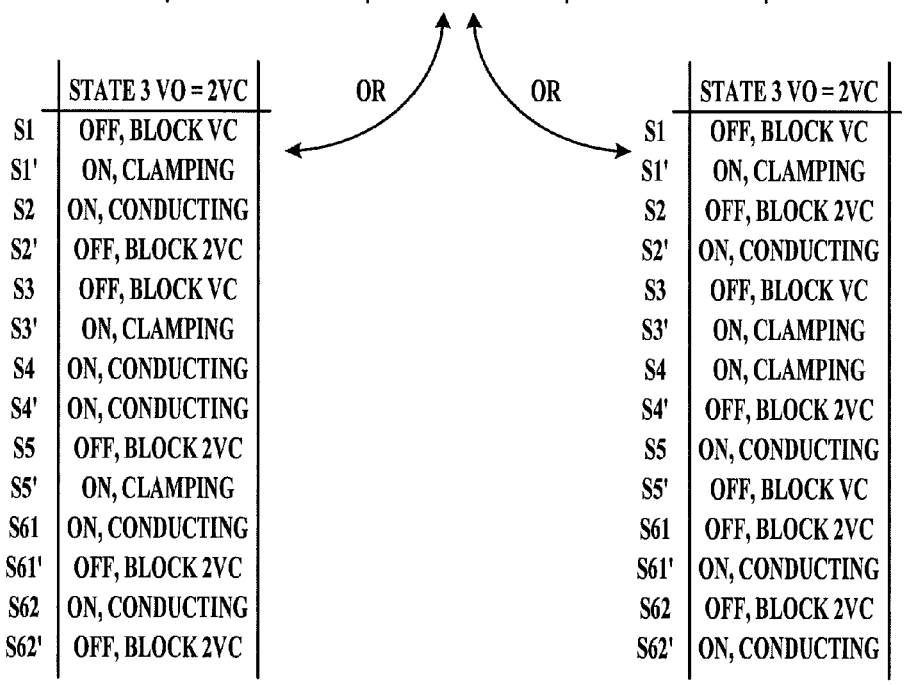
FIG. 16 is a switching state table.
Figure 17:
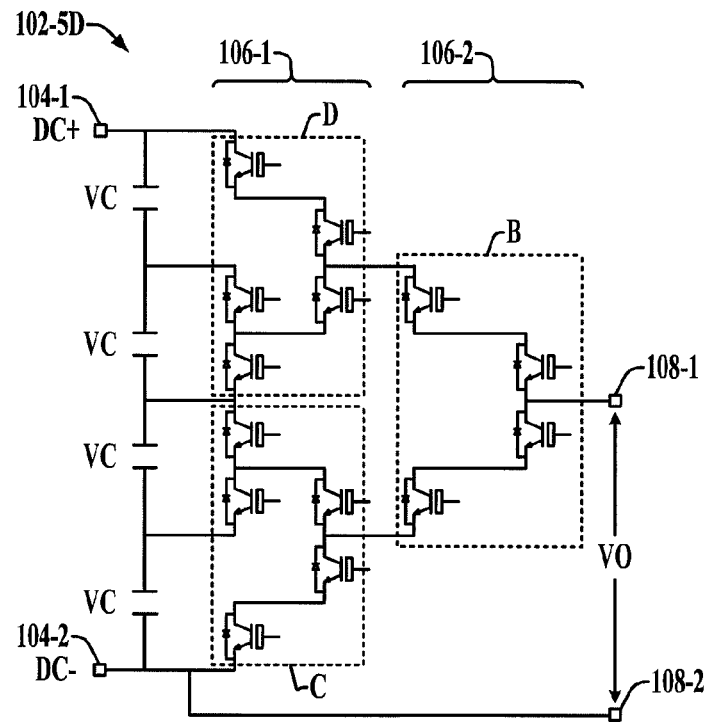
FIGS. 17-38 are schematic diagrams.

FIGS. 15 and 17 illustrate further non-limiting SMAC stage examples 102-5C and 102-5D in which the first switching stage circuit 106-1 includes a cell circuit C and a cell circuit D, where the second switching stage circuit 106-2 includes a four-device single pole double throw cell circuit B. FIG. 16 illustrates a switching state table 109a showing non-limiting examples of suitable switching states for providing five distinct output voltages in the power converter stage 102-5C of FIG. 15. As seen in the table 109a, moreover, there are multiple different possible switching signal combinations that yield the third state (STATE 3, VO=2VC). As with the above-described four-level example of FIGS. 3 and 4, the five-level power converter stage 102-5C in FIGS. 15 and 16 provide certain "on" switch states resulting in conduction, as well as other "on" states for clamping, as well as "off" switch states for blocking VC and for blocking 2VC.

Figure 18:
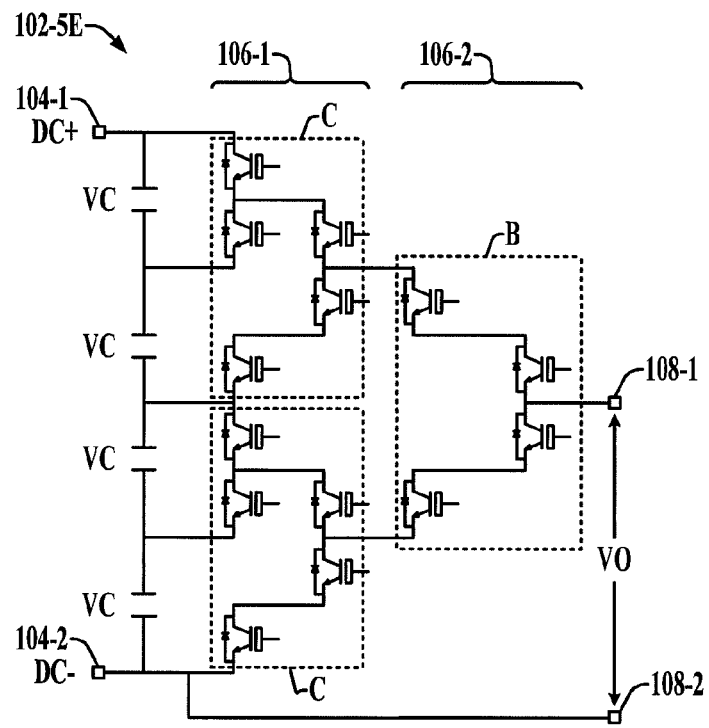
Figure 19:
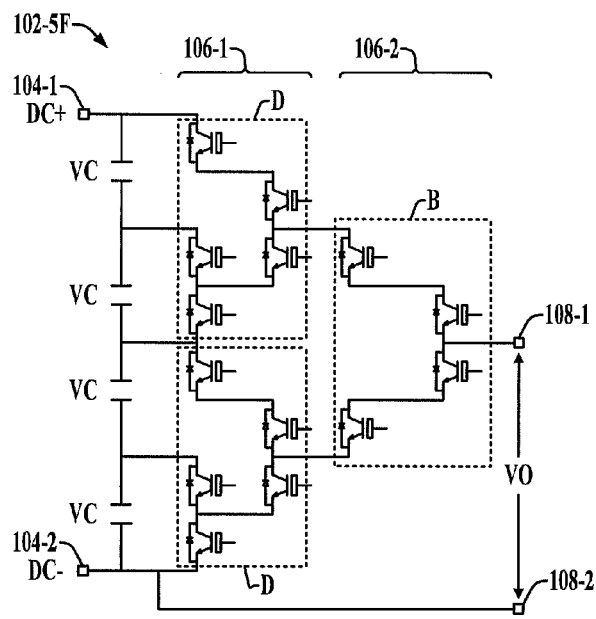

FIG. 18 shows an embodiment 102-5E with two cell circuits C in the first switching stage circuit 106-1, and FIG. 19 illustrates an example 102-5F with first and second cell circuits D in the first switching stage circuit 106-1. In the embodiments of FIGS. 15 and 17-19 (and those of FIGS. 20 and 21 below), the use of a four-device single pole double throw cell circuit B in the second or final switching stage circuit 106-2 (M=2) provides for a total of 14 switching devices, which is a significant reduction compared with the full matrix five-level circuit 2-5 having 20 switches in FIG. 13. Different embodiments are possible that can use two-device or four-device single pole double throw cell switch circuits A or B interchangeably, whether in the final switching stage circuit 106-M or in other switching stage circuits 106 (e.g., for higher level "L" circuits, certain of which are illustrated and described further below).

FIGS. 20 and 21 illustrate further five-level embodiments 102-5G and 102-5H, respectively. In FIG. 20, the first switching stage circuit 106-1 includes an upper single pole triple throw cell circuit E having four switching devices and a diode D1, and the lower single pole triple throw cell switch circuit F includes a diode D1, with the diodes D1 of the cell switch circuits E and F being coupled with the mid-converter stage DC voltage node. In the example of FIG. 21, moreover, the single pole triple throw switch cell circuits G and H each include first and second diodes D1 and D2, coupled in series with one another between the middle converter stage DC voltage node and the pole input terminal. In this regard, the diodes D1 and D2 replace switching devices in certain of the single pole triple throw configurations, and function to selectively provide blocking functions and conduction functions, whereby the power converter stage 102-5G of FIG. 20 includes a total of two diodes and 12 switching devices, and the converter stage 102-5H in FIG. 21 includes four diodes and a total of 10 switching devices. Moreover, alternate embodiments are possible in which the four-device single pole double throw switch cell circuit B in the final or second switching stage circuit 106-2 can be replaced with a two-device single pole double throw switch cell circuit A in order to reduce the switching device total by a further two devices.

Figure 22:
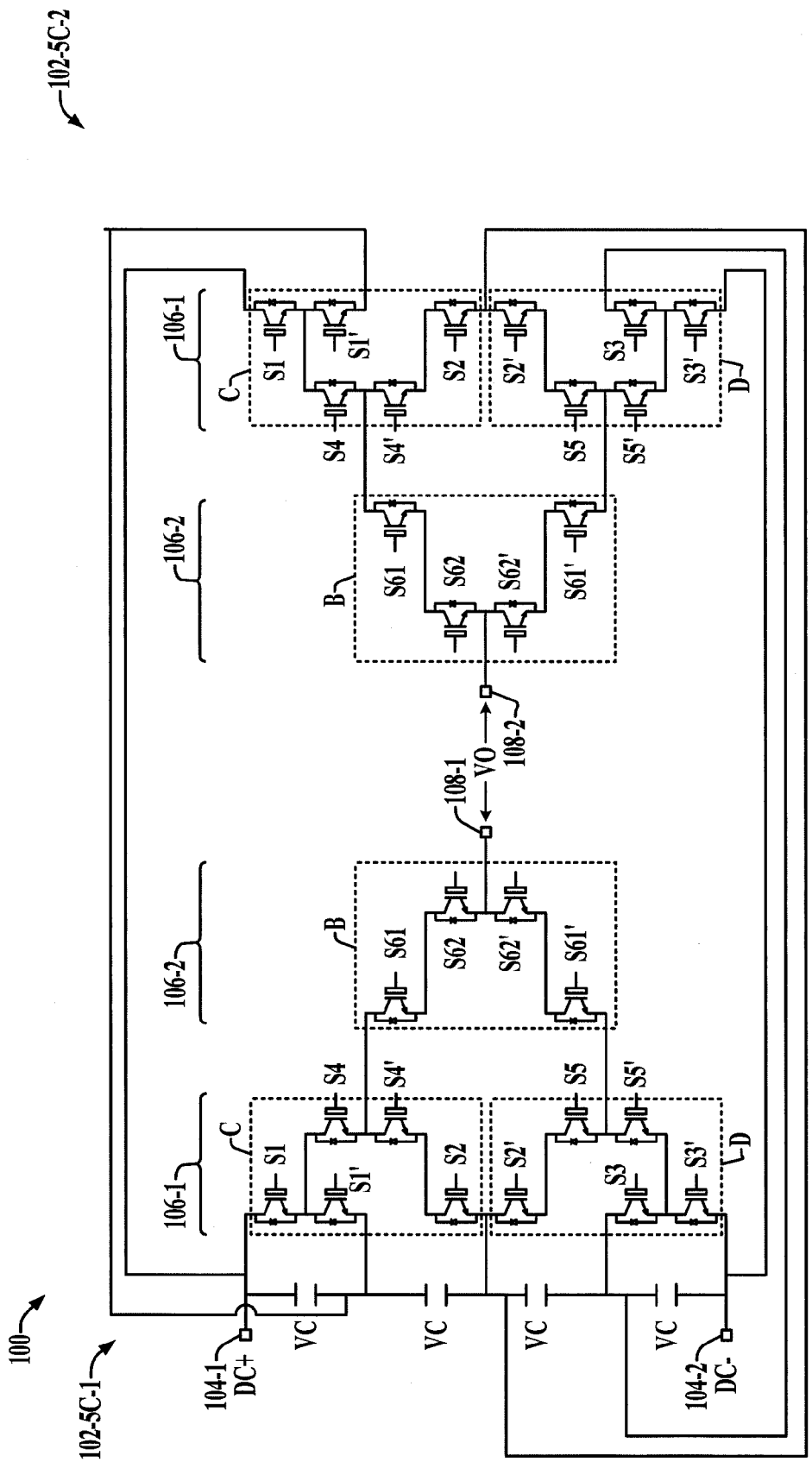

FIG. 22 illustrates an example H-bridge conversion system 100 using five-level power converter stages 102-5C-1 and 102-5C-2, each of which is similar in construction to the cell 102-5C of FIG. 15, with the output terminals 108-1 and 108-2 of the respective converter stages providing an output voltage VO having 9 distinct voltage levels. In certain embodiments, the two converter stages 102-5C-1 and 102-5C-2 share the same DC link capacitor bank and converter stage DC inputs 104 are connected to a common DC bus. In other embodiments, each converter stage has its own DC link and the converter stage DC inputs are connected to different DC supplies.

Figure 24:
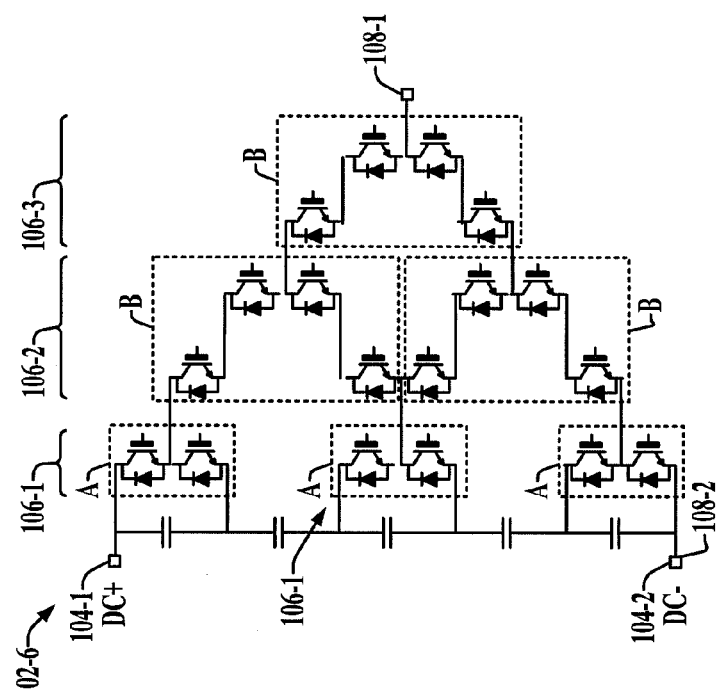
Figure 23:
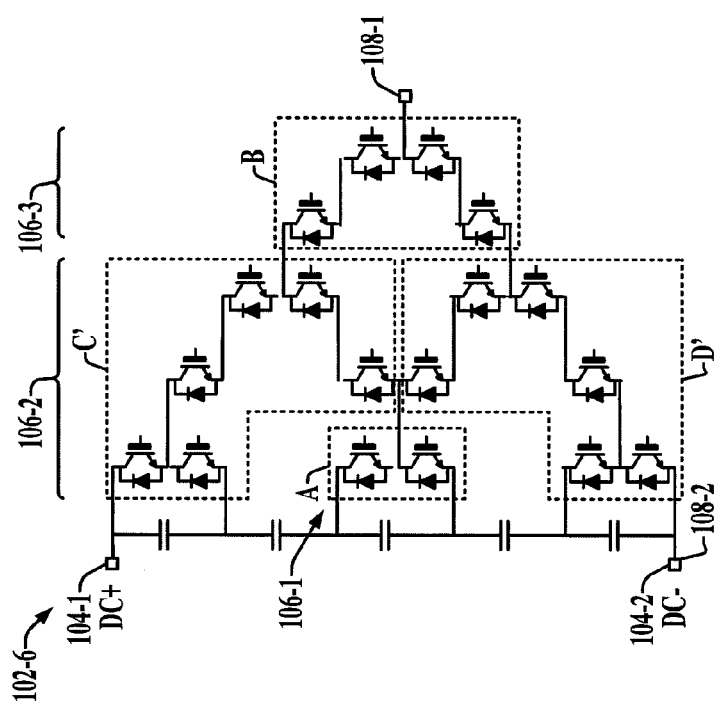
Figure 25:
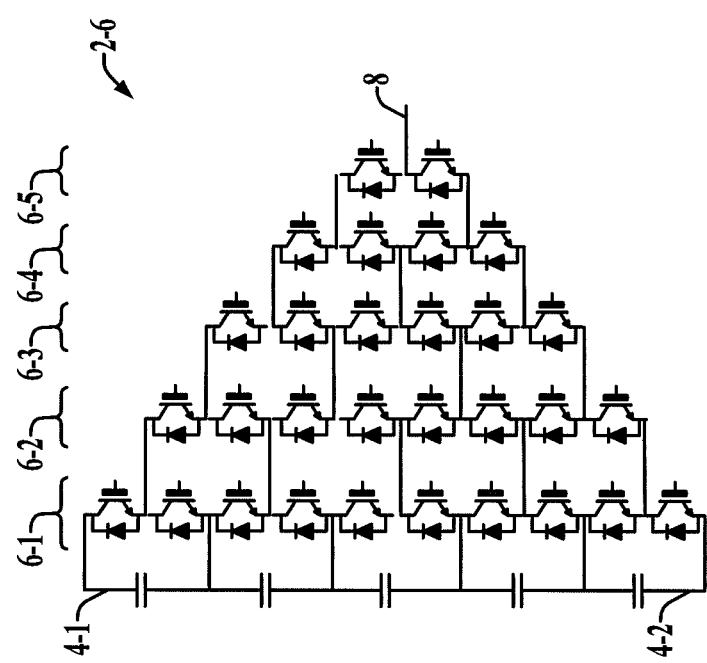

Referring now to FIGS. 23-25, FIG. 23 illustrates a six-level sparse matrix actively clamped power converter stage 102-6, viewed as having three switching stage circuits 106-1, 106-2 and 106-3, where the first switching stage circuit 106-1 includes a single two-device single pole double throw circuit A, the second switching stage circuit 106-2 includes upper and lower single pole triple throw switching cell circuits C' and D', respectively, and the final or third switching stage circuit 106-3 includes a four-device single pole double throw cell circuit B. FIG. 24 illustrates the same circuit 102-6, showing the first switching state circuit 106-1 including three two-device single pole double throw cell circuits A, with the second switching state circuit 106-2 including upper and lower four-device single pole double throw cell circuits B, and the final switching state circuit 106-3 having a four-device single pole double throw cell circuit B. In this six-level sparse matrix converter stage 102-6, a total of 18 switching devices are used. In contrast, the full matrix six-level converter stage 2-6 in FIG. 25 includes a total of 30 switching devices, disposed in five switching stages 6-1 through 6-5. It will be appreciated, moreover, that the total number of switching devices in the sparse matrix converter stage 102-6 can be further reduced, for example, by substituting two-device single pole double throw circuits A for the four-device single pole double throw circuits B in the second and third switching state circuits 106-2 and 106-3 of FIG. 24, thereby achieving six-level power conversion using as few as 12 switches and no flying capacitors. In certain embodiments, some of the active switching devices can be replaced by diodes. For example, the four active switching devices of the second switching stage that are connected to the middle switching cell circuit A of the first switching stage, can be replaced by 4 diodes.

Figure 27:
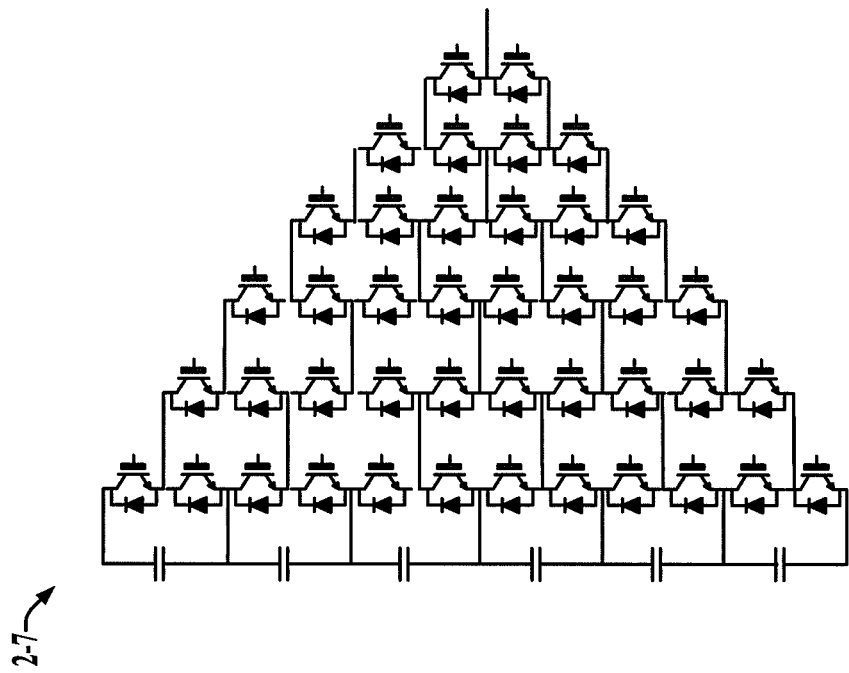
Figure 26:
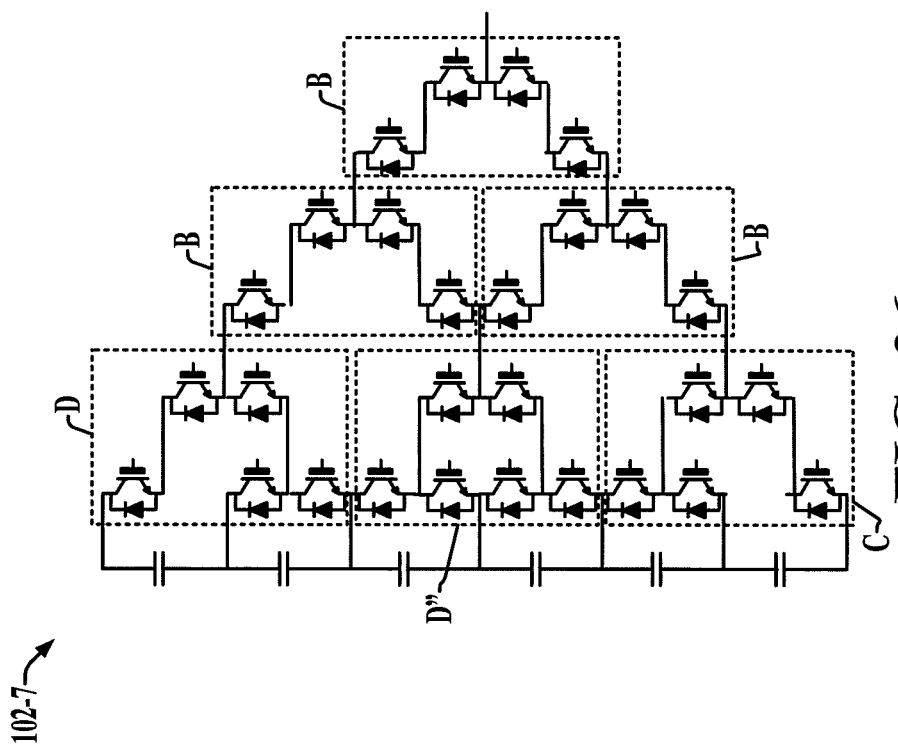
Figure 28:
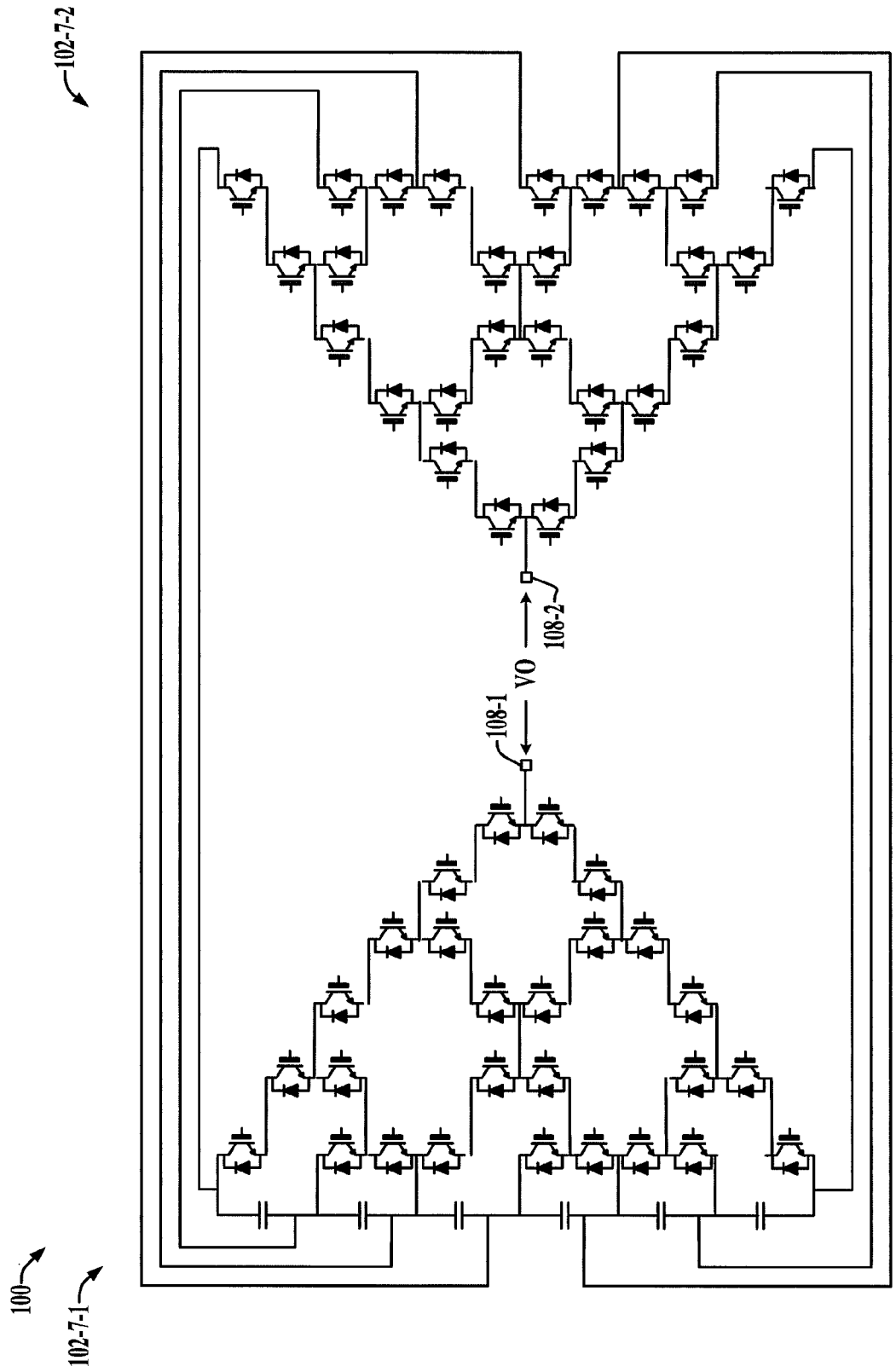

Referring now to FIGS. 26-28, FIG. 26 shows a sparse matrix power converter stage 102-7 that uses single pole triple throw cell circuits C, D and D" in a first switching stage circuit, as well as four-device single pole double throw cell circuits B in the remaining two switching stage circuits. In this example, therefore, a total of 28 switching devices are used. In certain embodiments, the first switching stage can be composed of any combinations of single pole double throw cell circuits C, D or D" shown in FIGS. 10 and 11 with a minor change in the total number of switching devices. For example the cell circuit D" can be replaced by cell circuit D resulting in a total of 27 switching devices. In other embodiments, some of the active switching devices can be replaced by diodes. For example, the four active switching devices of the second switching stage that are connected to the middle switching cell circuit D of the first switching stage, can be replaced by 4 diodes. In contrast, FIG. 27 shows a seven-level full matrix circuit 2-7, having a total of 42 switching devices. FIG. 28 illustrates an H-bridge configuration of two seven-level power converter stages 102-7-1 and 102-7-2, with an output voltage VO being provided between the respective output terminals 108-1 and 108-2. Similar to other H-bridge embodiments, the two switching stages 102-7-1 and 102-7-2 can share the same DC link capacitor bank connected to a common DC bus, or use separate DC links connected to separate DC sources.

Figure 30:
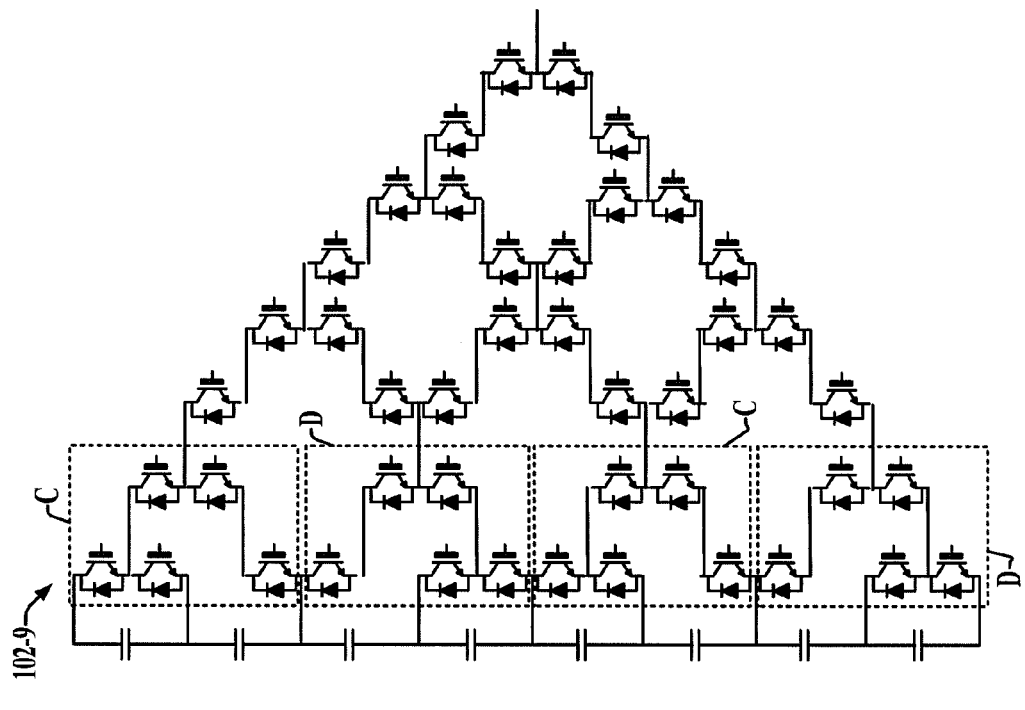
Figure 29:
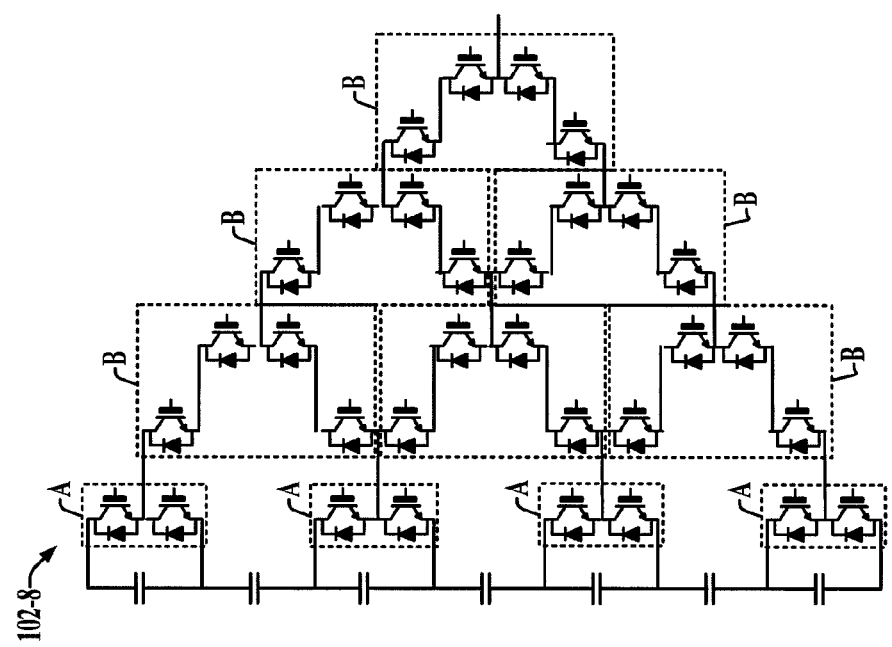

Referring now to FIGS. 29-38, higher order levels L can be achieved using the sparse matrix actively coupled concepts of the present disclosure. FIG. 29 illustrates an eight-level example 102-8, where the order "L" is an even number (L=8), including four switching stage circuits, each having one or more single pole double throw circuits A, B. In FIG. 30, a nine-level stage 102-9 is shown, where the order "L" is an odd integer (L=9), with the first switching stage circuit including single pole triple throw switch cell circuits C and D, and the remaining three switching stage circuits including four-device single pole double throw cell circuits, for a total of 44 switching devices. As previously mentioned, further reductions in the total number of switching devices can be achieved, for example, by replacing one or more of the four-device single pole double throw cell circuits B with a two-device single pole double throw cell circuit A.

Figure 31:
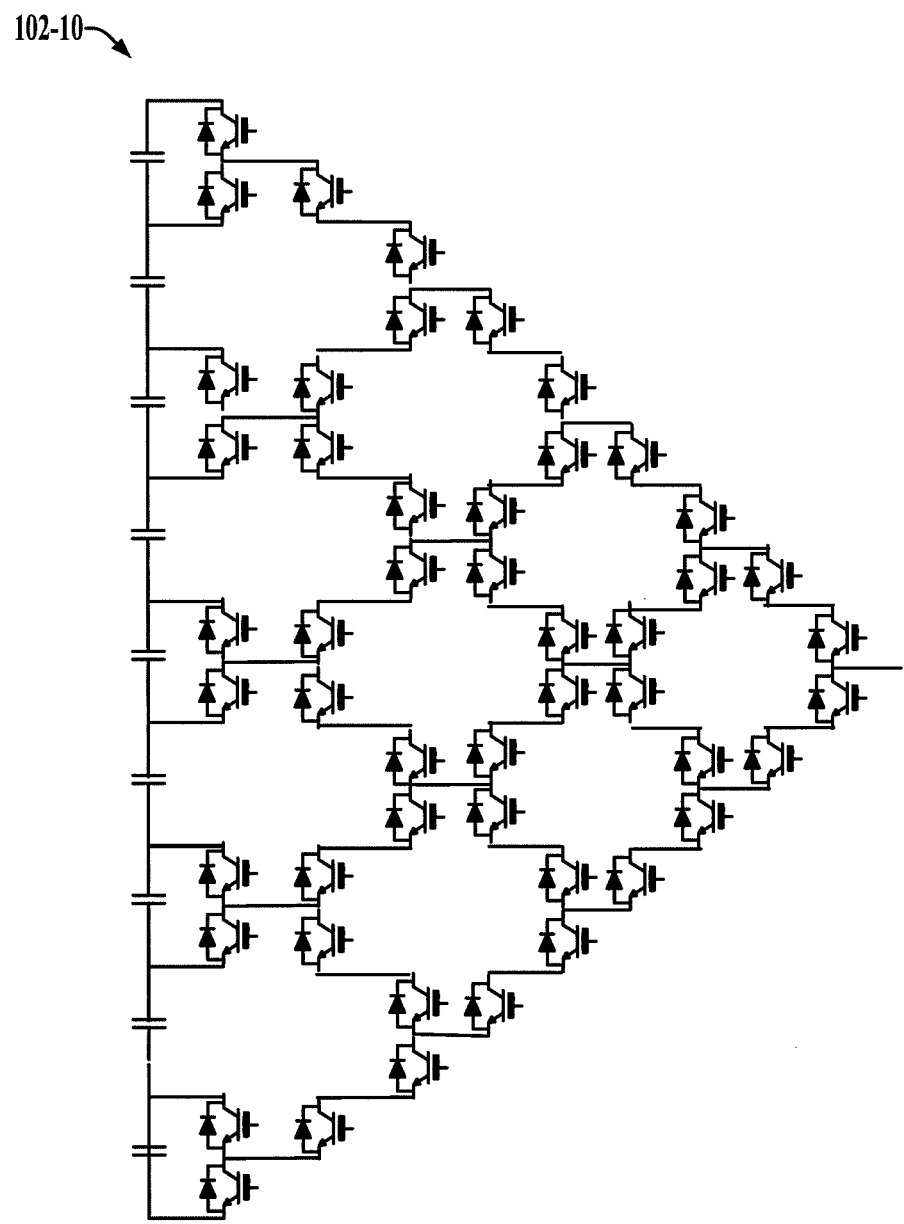
Figure 32:
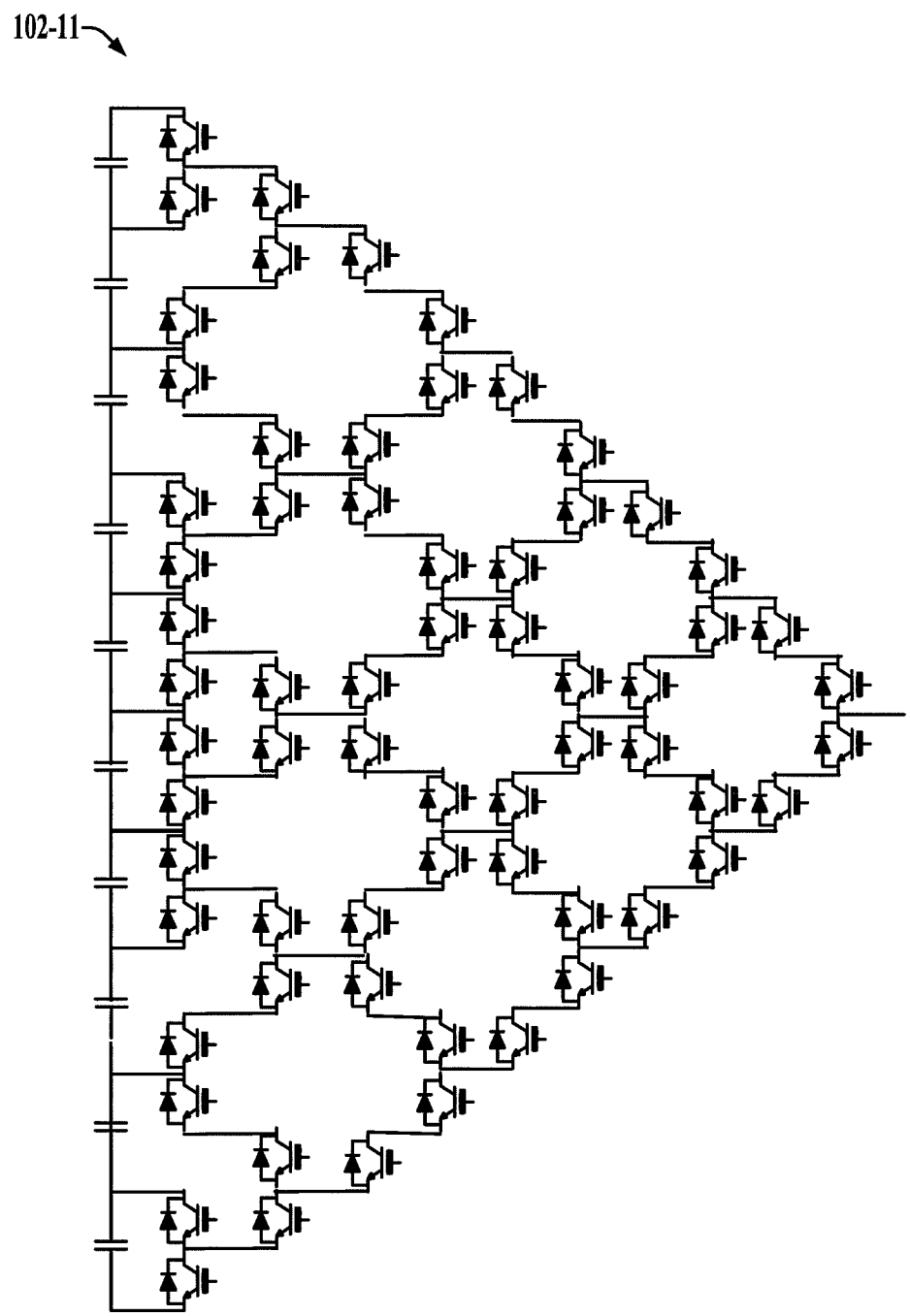
Figure 33:
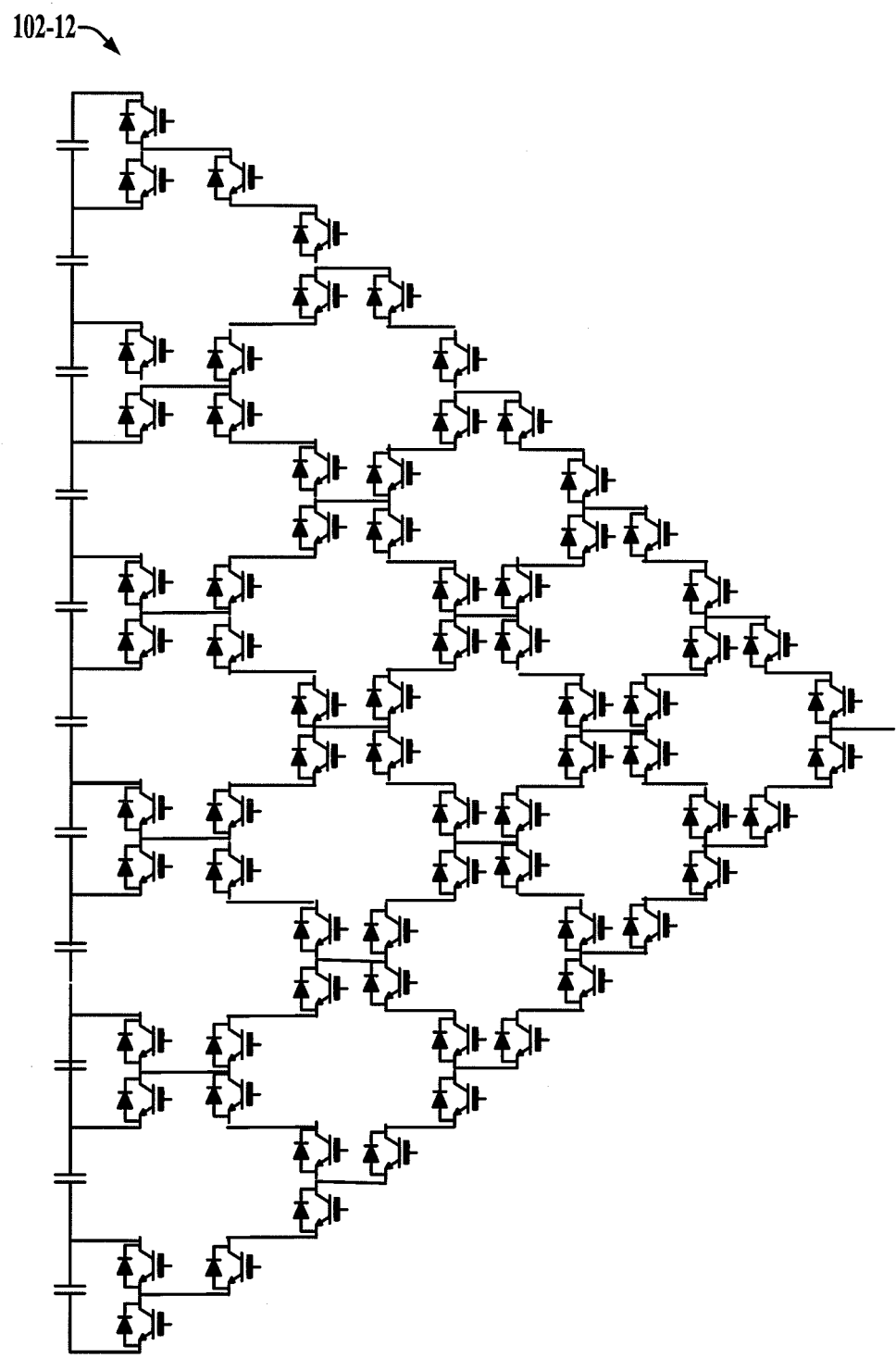
Figure 34:
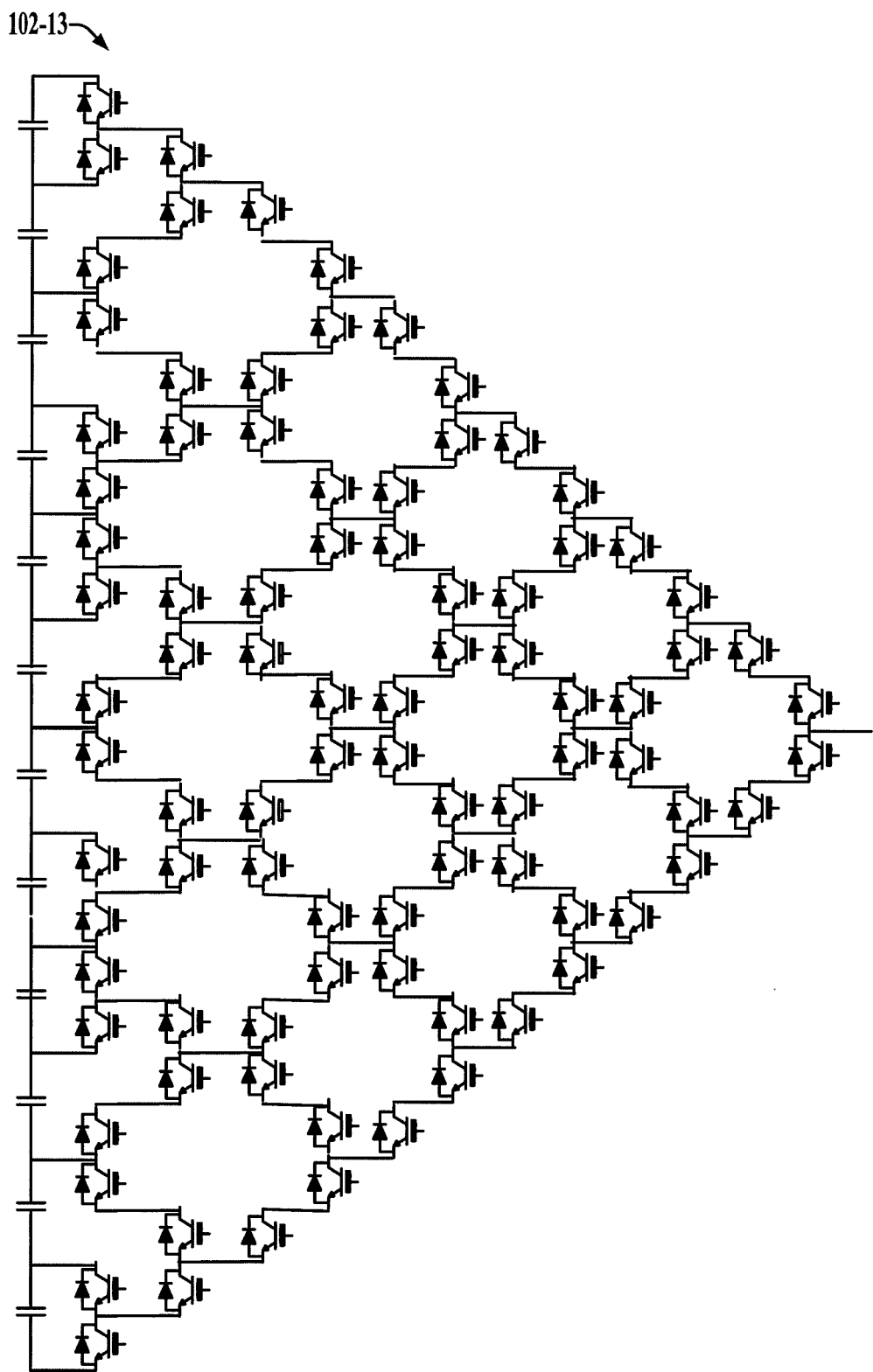
Figure 35:
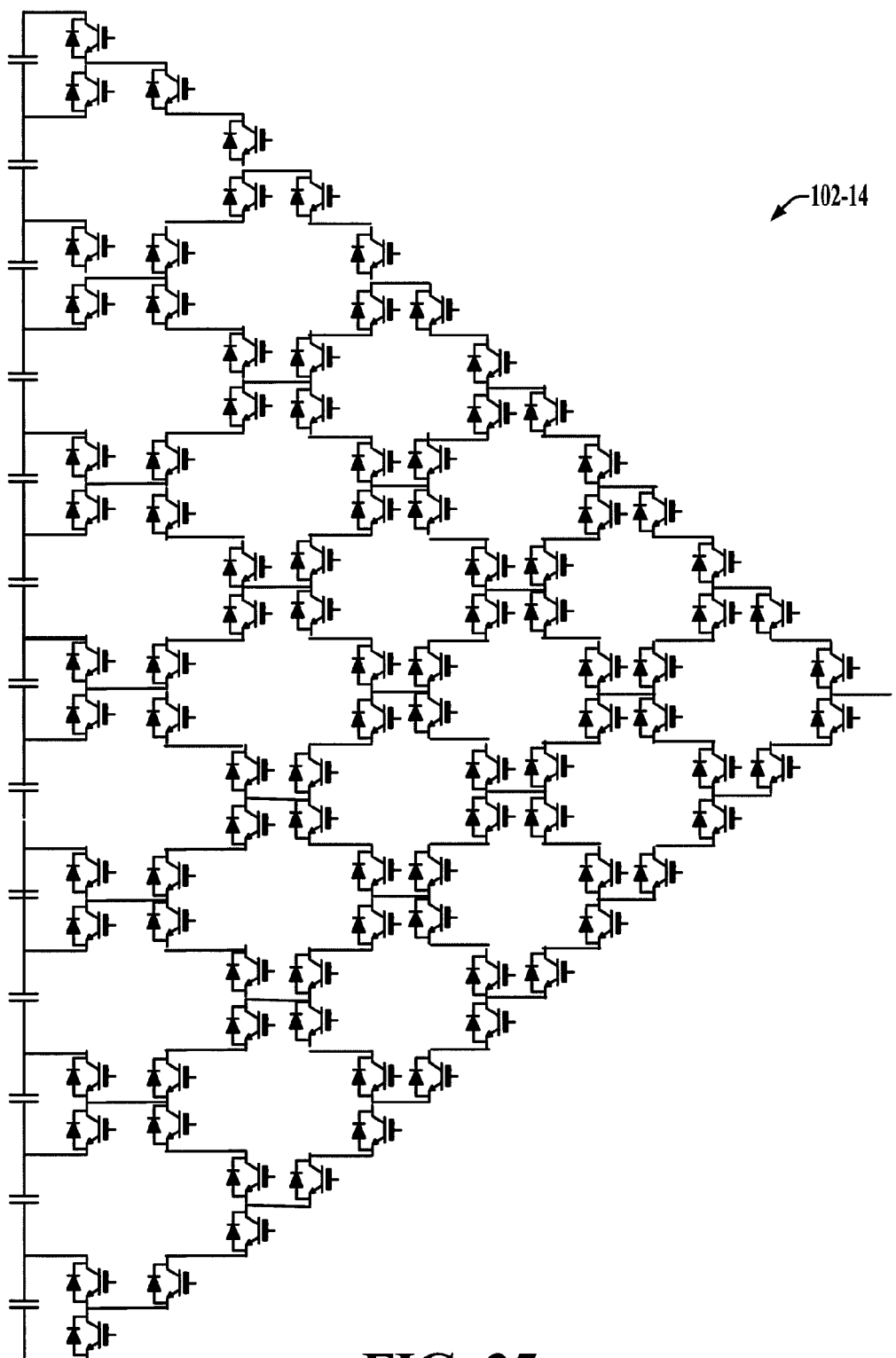
Figure 36:
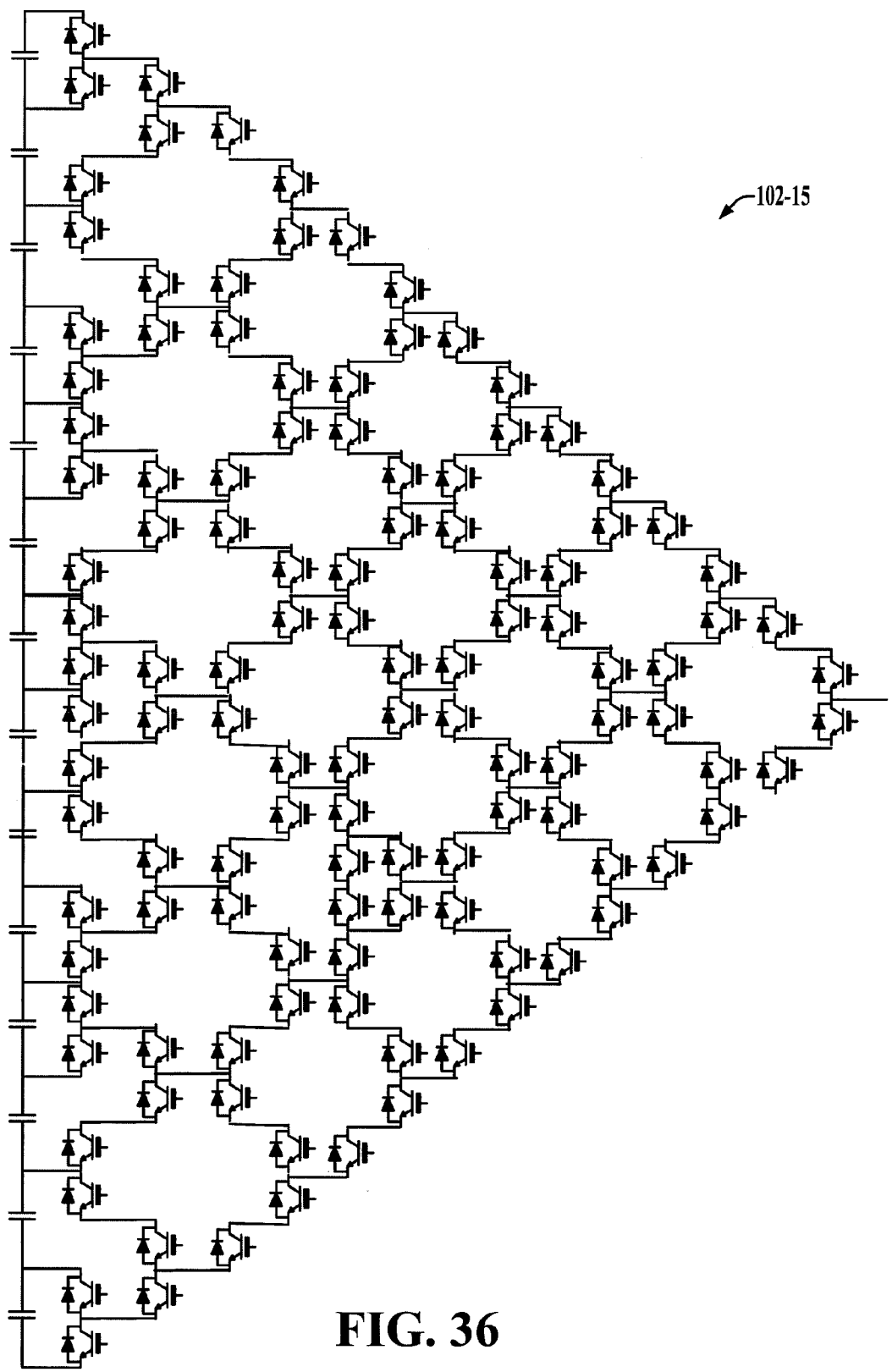
Figure 37:
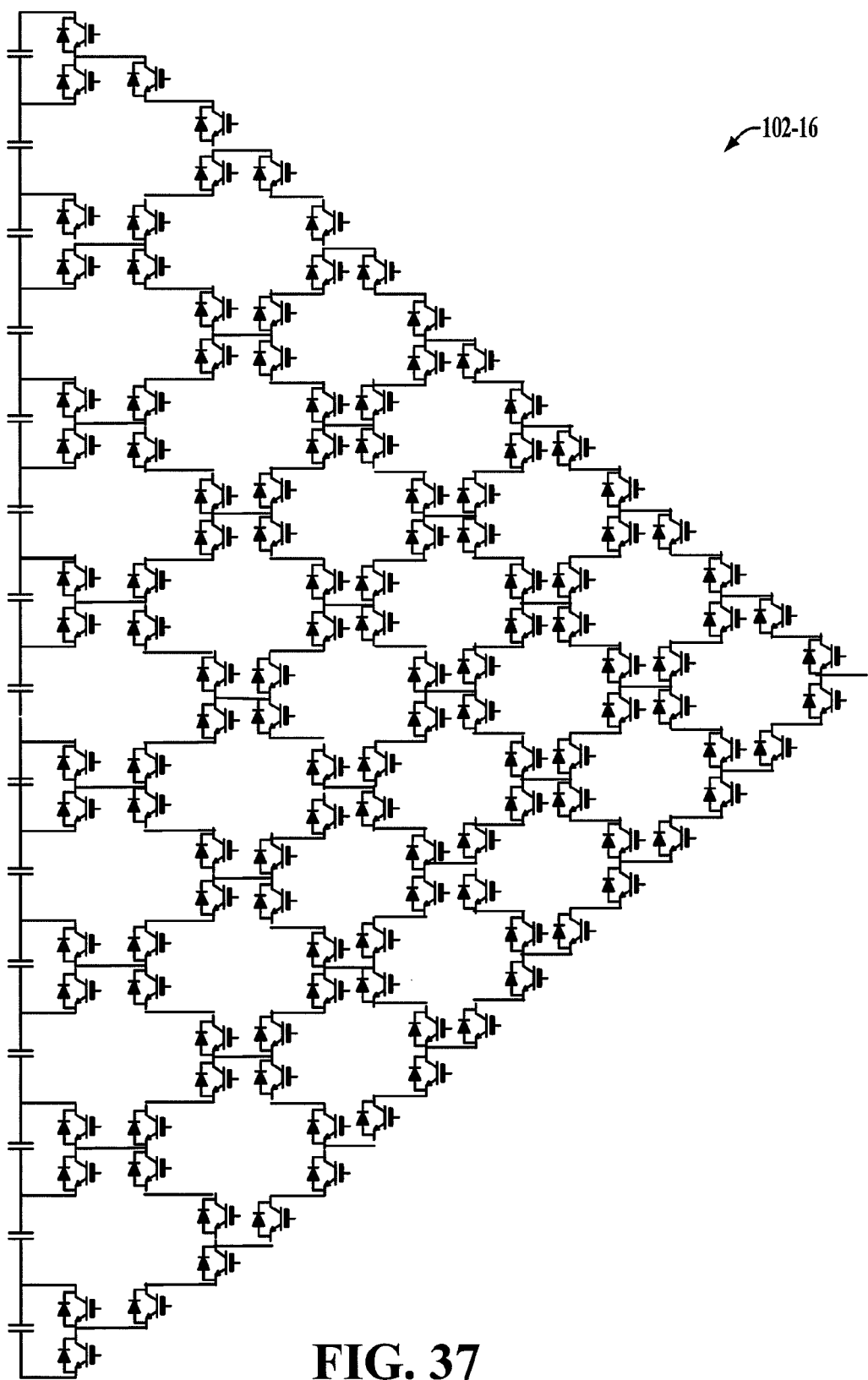
Figure 38:
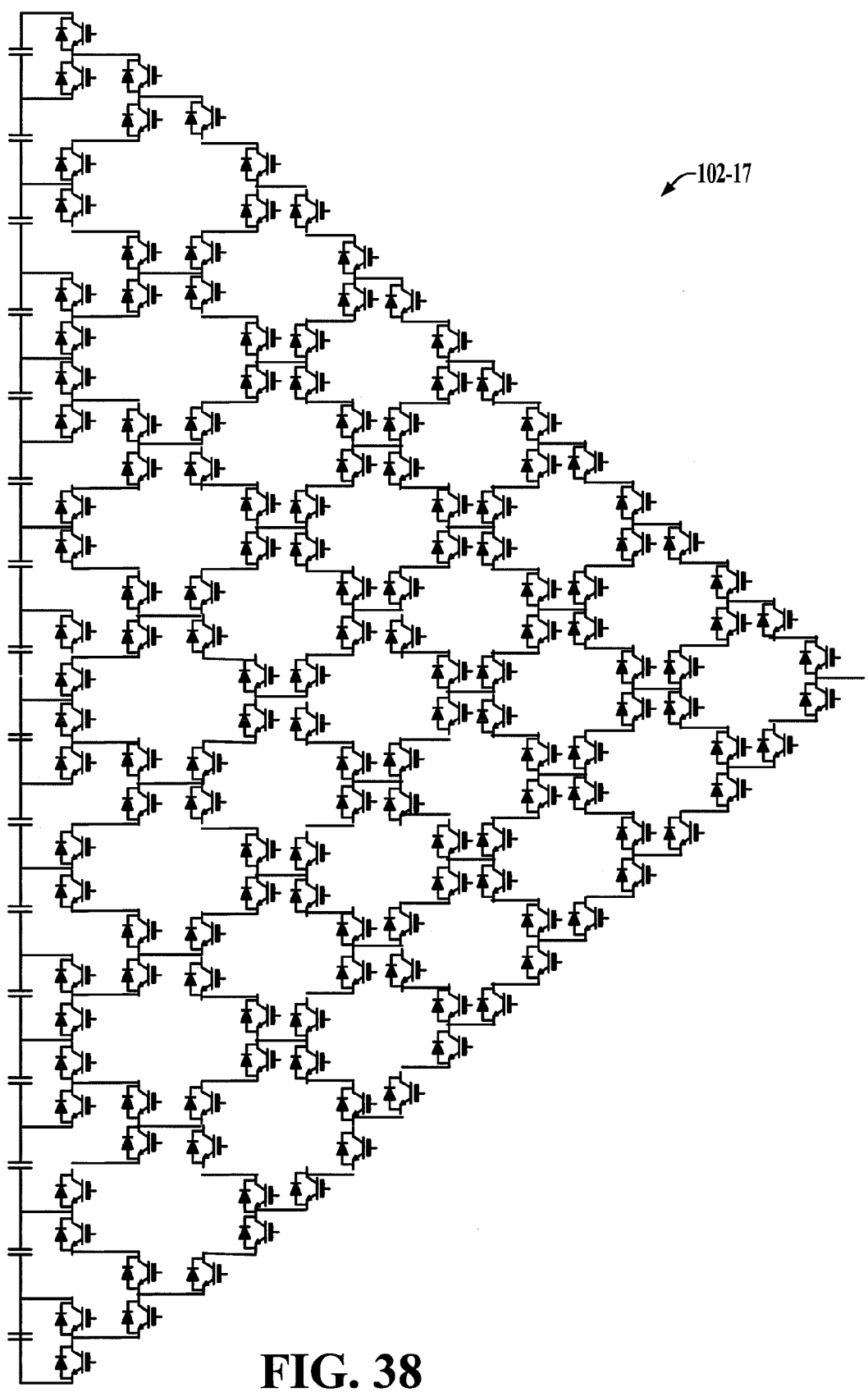

FIG. 31 illustrates another even integer order 10-level power converter stage 102-10, including two-device single pole double throw cell circuits A in the first switching stage circuit, and the remaining switching stage circuits including four-device single pole double throw cell circuits B for a total of 50 switching devices. FIG. 32 illustrates an 11-level power converter stage 102-11 with a plurality of single pole triple throw switch cell circuits (e.g., C, D or D") for 66 total switching devices. In this example (L is an odd integer 11), one or more of the switching devices coupled with the central DC voltage node may be replaced with a diode for further switching device total reduction. FIG. 33 illustrates a 12-level sparse matric power converter stage 102-12, FIG. 34 illustrates a 13-level SMAC converter stage 102-13, and FIGS. 35-38 illustrate further SMAC converter stage examples 102-14, 102-15, 102-16 and 102-17 for L=14, 15, 16 and 17, respectively.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power converter stage, comprising:
   first and second converter stage DC inputs;
   an even integer number N capacitors or DC voltage sources coupled in series with one another between the first and second converter stage DC inputs to provide an odd integer number L=N+1 converter stage DC voltage nodes, N being greater than 2;
   a converter stage output; and
   a switching circuit with no more than L*(L-1) switching devices and no floating DC storage capacitors, the switching circuit comprising an integer number M switching stage circuits coupled between the converter stage DC voltage nodes and the converter stage output, M being greater than 1, a first switching stage circuit being coupled with the converter stage DC voltage nodes, a final switching state circuit being coupled with the converter stage output, individual switching stage circuits comprising at least one switch cell circuit, and individual switch cell circuits comprising:
   a single pole double throw circuit including no more than four switching devices, no floating DC storage capacitors, a first switch cell circuit input, a second switch cell circuit input, and a single switch cell circuit output selectively coupleable by the no more than four switching devices to one of the first switch cell circuit input and the second switch cell circuit input, or
   a single pole triple throw circuit including no more than six switching devices, no floating DC storage capacitors, a first switch cell circuit input, a second switch cell circuit input, a third switch cell circuit input, and a single switch cell circuit output selectively coupleable by the no more than six switching devices to one of the first switch cell circuit input, the second switch cell circuit input, and the third switch cell circuit input;
   wherein the first switching stage circuit comprises a plurality of single pole triple throw switch cell circuits; and
   wherein the switching devices of the switching circuit are operable according to switching control signals to selectively electrically couple the converter stage output with a single one of the L converter stage DC voltage nodes to provide one of L distinct voltage levels at the converter stage output; and
   wherein individual single pole triple throw switch cell circuits of the first switching stage circuit include no more than six switching devices, no floating DC storage capacitors, a first switch cell circuit input coupled with a first one of the converter stage DC voltage nodes, a second switch cell circuit input coupled with a second one of the converter stage DC voltage nodes, a third switch cell circuit input coupled with a third one of the converter stage DC voltage nodes, and a single switch cell circuit output coupled with a succeeding switching stage circuit.

2. The power converter stage of claim 1, wherein the final switching stage circuit comprises a single pole double throw switch cell circuit, and wherein the single switch cell circuit output of the final switching stage circuit is coupled with the converter stage output.

3. The power converter stage of claim 2, wherein the single pole double throw switch cell circuit of the final switching stage circuit comprises first and second switching devices coupled in series with one another between the converter stage output and the first switch cell circuit input, and third and fourth switching devices coupled in series with one another between the converter stage output and the second switch cell circuit input.

4. The power converter stage of claim 2, wherein the single pole double throw switch cell circuit of the final switching stage circuit comprises a first switching device coupled between the converter stage output and the first switch cell circuit input, and a second switching device coupled between the converter stage output and the second switch cell circuit input.

5. The power converter stage of claim 1, wherein the final switching stage circuit comprises a single pole double throw switch cell circuit, including first and second switching devices coupled in series with one another between the converter stage output and the first switch cell circuit input, and third and fourth switching devices coupled in series with one another between the converter stage output and the second switch cell circuit input.

6. The power converter stage of claim 2, wherein the individual single pole triple throw switch cell circuits of the first switching stage circuit include first and second switching devices coupled in series with one another between the succeeding switching stage circuit and the first one of the converter stage DC voltage nodes, third and fourth switching devices coupled in series with one another between the succeeding switching stage circuit and the second one of the converter stage DC voltage nodes, and a fifth switching device coupled between the third one of the converter stage DC voltage nodes and the fourth switching device.

7. The power converter stage of claim 2, wherein the individual single pole triple throw switch cell circuits of the first switching stage circuit include first and second switching devices coupled in series with one another between the succeeding switching stage circuit and the first one of the converter stage DC voltage nodes, third and fourth switching devices coupled in series with one another between the succeeding switching stage circuit and the second one of the converter stage DC voltage nodes, and a diode coupled between the third one of the converter stage DC voltage nodes and the fourth switching device.

8. The power converter stage of claim 2, wherein the individual single pole triple throw switch cell circuits of the first switching stage circuit include first and second switching devices coupled in series with one another between the succeeding switching stage circuit and the first one of the converter stage DC voltage nodes, a third switching device coupled between the first switching device and the second one of the converter stage DC voltage nodes, and first and second diodes coupled in series with one another between the third one of the converter stage DC voltage nodes and the first switching device.

9. The power converter stage of claim 1, wherein the individual single pole triple throw switch cell circuits of the first switching stage circuit include first and second switching devices coupled in series with one another between the succeeding switching stage circuit and the first one of the converter stage DC voltage nodes, third and fourth switching devices coupled in series with one another between the succeeding switching stage circuit and the second one of the converter stage DC voltage nodes, and a fifth switching device coupled between the third one of the converter stage DC voltage nodes and the fourth switching device.

10. The power converter stage of claim 1, wherein the individual single pole triple throw switch cell circuits of the first switching stage circuit include first and second switching devices coupled in series with one another between the succeeding switching stage circuit and the first one of the converter stage DC voltage nodes, third and fourth switching devices coupled in series with one another between the succeeding switching stage circuit and the second one of the converter stage DC voltage nodes, and a diode coupled between the third one of the converter stage DC voltage nodes and the fourth switching device.

11. The power converter stage of claim 1, wherein the individual single pole triple throw switch cell circuits of the first switching stage circuit include first and second switching devices coupled in series with one another between the succeeding switching stage circuit and the first one of the converter stage DC voltage nodes, a third switching device coupled between the first switching device and the second one of the converter stage DC voltage nodes, and first and second diodes coupled in series with one another between the third one of the converter stage DC voltage nodes and the first switching device.

12. A power conversion system, comprising:
first and second power converter stages, each power converter stage comprising:
first and second converter stage DC inputs;
an even integer number N capacitors or DC voltage sources coupled in series with one another between the first and second converter stage DC inputs to provide an odd integer number L=N+1 converter stage DC voltage nodes, N being greater than 2;
a converter stage output; and
a switching circuit with no more than L*(L−1) switching devices and no floating DC storage capacitors, the switching circuit comprising an integer number M switching stage circuits coupled between the converter stage DC voltage nodes and the converter stage output, M being greater than 1, a first switching stage circuit being coupled with the converter stage DC voltage nodes, a final switching state circuit being coupled with the converter stage output, individual switching stage circuits comprising at least one switch cell circuit, and individual switch cell circuits comprising:
a single pole double throw circuit including no more than four switching devices, no floating DC storage capacitors, a first switch cell circuit input, a second switch cell circuit input, and a single switch cell circuit output selectively coupleable by the no more than four switching devices to one of the first switch cell circuit input and the second switch cell circuit input, or
a single pole triple throw circuit including no more than six switching devices, no floating DC storage capacitors, a first switch cell circuit input, a second switch cell circuit input, a third switch cell circuit input, and a single switch cell circuit output selectively coupleable by the no more than six switching devices to one of the first switch cell circuit input, the second switch cell circuit input, and the third switch cell circuit input;
wherein the first switching stage circuit comprises a plurality of single pole triple throw switch cell circuits; and
wherein the switching devices of the switching circuits of each power converter stage are operable according to switching control signals to selectively electrically couple the corresponding converter stage output with a single one of the L corresponding converter stage DC voltage nodes to provide one of L distinct voltage levels at the corresponding converter stage output to provide one of (2L−1) distinct voltage levels between the converter stage outputs of the first and second power converter stages; and
wherein individual single pole triple throw switch cell circuits of the first switching stage circuit include no more than six switching devices, no floating DC storage capacitors, a first switch cell circuit input coupled with a first one of the converter stage DC voltage nodes, a second switch cell circuit input coupled with a second one of the converter stage DC voltage nodes, a third switch cell circuit input coupled with a third one of the converter stage DC voltage nodes, and a single switch cell circuit output coupled with a succeeding switching stage circuit.

13. A power conversion system, comprising:
first, second and third power converter stages, each power converter stage comprising:
first and second converter stage DC inputs;
an even integer number N capacitors or DC voltage sources coupled in series with one another between the first and second converter stage DC inputs to provide an odd integer number L=N+1 converter stage DC voltage nodes, N being greater than 2;
a converter stage output; and
a switching circuit with no more than L*(L−1) switching devices and no floating DC storage capacitors, the switching circuit comprising an integer number M switching stage circuits coupled between the converter stage DC voltage nodes and the converter stage output, M being greater than 1, a first switching stage circuit being coupled with the converter stage DC voltage nodes, a final switching state circuit being coupled with the converter stage output, individual switching stage circuits comprising at least one switch cell circuit, and individual switch cell circuits comprising:
a single pole double throw circuit including no more than four switching devices, no floating DC storage capacitors, a first switch cell circuit input, a second switch cell circuit input, and a single switch cell circuit output selectively coupleable by the no more than four switching devices to one of the first switch cell circuit input and the second switch cell circuit input, or a single pole triple throw circuit including no more than six switching devices, no floating DC storage capacitors, a first switch cell circuit input, a second switch cell circuit input, a third switch cell circuit input, and a single switch cell circuit output selectively coupleable by the no more than six switching devices to one of the first switch cell circuit input, the second switch cell circuit input, and the third switch cell circuit input;

wherein the first switching stage circuit comprises a plurality of single pole triple throw switch cell circuits; and wherein the switching devices of the switching circuits of each power converter stage are operable according to switching control signals to selectively electrically couple the corresponding converter stage output with a single one of the L corresponding converter stage DC voltage nodes to provide one of L distinct voltage levels at the corresponding converter stage output; and wherein individual single pole triple throw switch cell circuits of the first switching stage circuit include no more than six switching devices, no floating DC storage capacitors, a first switch cell circuit input coupled with a first one of the converter stage DC voltage nodes, a second switch cell circuit input coupled with a second one of the converter stage DC voltage nodes, a third switch cell circuit input coupled with a third one of the converter stage DC voltage nodes, and a single switch cell circuit output coupled with a succeeding switching stage circuit.

* * * * *